(12) United States Patent
Bielesch et al.

(10) Patent No.: US 10,669,111 B2
(45) Date of Patent: Jun. 2, 2020

(54) METHOD OF AND APPARATUS FOR PROCESSING AN OBJECT

(71) Applicant: ENTRUST DATACARD CORPORATION, Shakopee, MN (US)

(72) Inventors: Ulrich Bielesch, Frucht (DE); Dominique Perdoux, Mardie (FR); Frederic Beulet, Meung sur Loire (FR); Thorsten Habel, Hanau (DE); Benoit Berthe, Orleans (FR)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 340 days.

(21) Appl. No.: 15/695,403

(22) Filed: Sep. 5, 2017

(65) Prior Publication Data

US 2017/0361411 A1    Dec. 21, 2017

Related U.S. Application Data

(63) Continuation of application No. 13/813,015, filed as application No. PCT/IB2010/002567 on Jul. 29, 2010, now abandoned.

(51) Int. Cl.
*B65H 5/26* (2006.01)
*B65H 29/60* (2006.01)
(Continued)

(52) U.S. Cl.
CPC ............. *B65H 5/26* (2013.01); *B65H 29/60* (2013.01); *G06K 19/07716* (2013.01);
(Continued)

(58) Field of Classification Search
CPC .. B65H 2701/1914; B65H 15/00; B65H 5/26; B65H 85/00; B65H 2301/333;
(Continued)

(56) References Cited

U.S. PATENT DOCUMENTS 5,959,278 A * 9/1999 Kobayashi ............... B41J 2/325
101/232
6,261,012 B1    7/2001 Haas et al.
(Continued)

FOREIGN PATENT DOCUMENTS

EP    0835739    4/1998
EP    1134085    9/2001
(Continued)

OTHER PUBLICATIONS

Search Report for international application No. PCT/IB2010/002567, dated May 2, 2011 (4 pages).
(Continued)

*Primary Examiner* — Jeremy R Severson
(74) *Attorney, Agent, or Firm* — Hamre, Schumann, Mueller & Larson, P.C.

(57) ABSTRACT

An object processing machine for processing a plurality of objects, the machine comprising: a plurality of processing modules, each processing module having a modular structure co-operable with the modular structure of another processing module to form a modular assembly constituting the object processing machine; each processing module being operable to perform a corresponding processing operation on an object and being provided with at least one transfer unit located at a respective port of the processing module; each transfer unit being arranged to transfer an object to or from the corresponding processing module and/or to or from a transfer unit of another processing module of the modular assembly; the transfer units being arranged to co-operate with one another and/or with another processing unit such that objects can be guided from an input of the machine to an output of the machine via a plurality of different transport pathways through the machine, wherein the transport pathway taken by a said object being processed corresponds to the pre-determined processing operations to
(Continued)

be performed on the said object. A method of processing a plurality of objects using such a machine is also described.

7 Claims, 38 Drawing Sheets

(51) Int. Cl.
   *G06K 19/077* (2006.01)
   *B65H 7/00* (2006.01)
   *B65H 15/00* (2006.01)
(52) U.S. Cl.
   CPC ............... *B65H 7/00* (2013.01); *B65H 15/00* (2013.01); *B65H 2301/333* (2013.01); *B65H 2301/445* (2013.01); *B65H 2301/447* (2013.01); *B65H 2301/4482* (2013.01); *B65H 2402/10* (2013.01); *B65H 2511/415* (2013.01); *B65H 2513/42* (2013.01); *B65H 2513/51* (2013.01); *B65H 2557/13* (2013.01); *B65H 2701/1914* (2013.01); *Y10T 29/49* (2015.01); *Y10T 29/52* (2015.01)
(58) Field of Classification Search
   CPC ............ B65H 2402/10; B65H 2402/11; B65H 2404/14212; B65H 2404/15212
   See application file for complete search history.

(56) References Cited

U.S. PATENT DOCUMENTS

| | | | | |
|---|---|---|---|---|
| 6,513,806 | B2* | 2/2003 | Yui | .............. B41J 3/60 271/297 |
| 6,722,649 | B2 | 4/2004 | Yui | |
| 6,902,107 | B2* | 6/2005 | Shay | .............. G06K 17/00 235/381 |
| 7,093,831 | B2* | 8/2006 | Biegelsen | .............. B65H 5/062 209/657 |
| 7,475,810 | B2* | 1/2009 | Gampe | .............. G06K 17/0003 235/380 |
| 7,635,122 | B2* | 12/2009 | Ohta | .............. B65H 1/06 271/9.01 |
| 2002/0036376 | A1 | 3/2002 | Yui | |
| 2006/0039729 | A1 | 2/2006 | Mandel et al. | |
| 2007/0284216 | A1 | 12/2007 | Meier et al. | |
| 2009/0010739 | A1 | 1/2009 | Hinderer et al. | |
| 2009/0012642 | A1 | 1/2009 | Mertens et al. | |
| 2009/0152790 | A1 | 6/2009 | Kirschbauer et al. | |

FOREIGN PATENT DOCUMENTS

| | | |
|---|---|---|
| EP | 1445223 | 8/2004 |
| JP | 10-071648 | 3/1998 |
| JP | 2002-103714 | 4/2002 |
| JP | 2005-516312 | 6/2005 |
| JP | 2006-056256 | 3/2006 |
| JP | 2006-520041 | 8/2006 |
| JP | 2009-537882 | 10/2009 |

OTHER PUBLICATIONS

Written Opinion for international application No. PCT/IB2010/002567, dated May 2, 2011 (6 pages).
English translation of Office Action issued for Japanese patent application No. 2013-521231, dated Mar. 11, 2014 (6 pages).

* cited by examiner

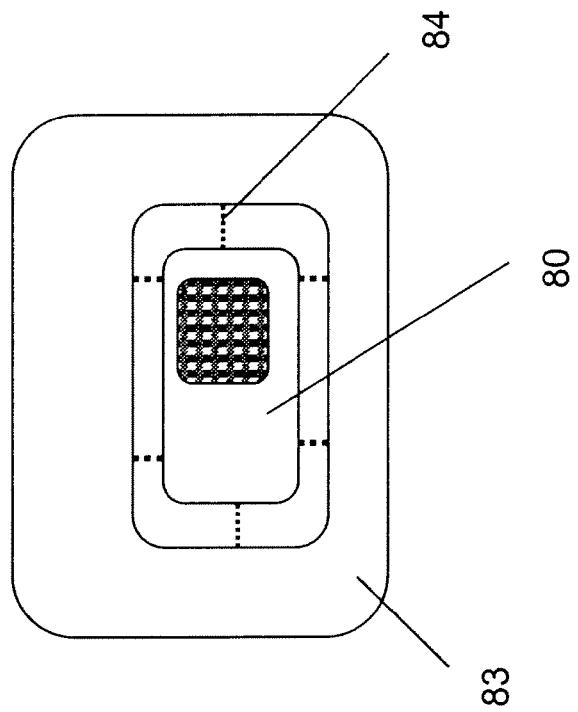
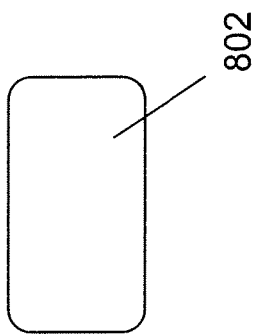
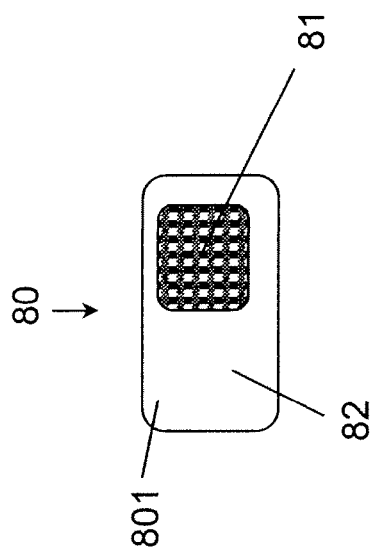

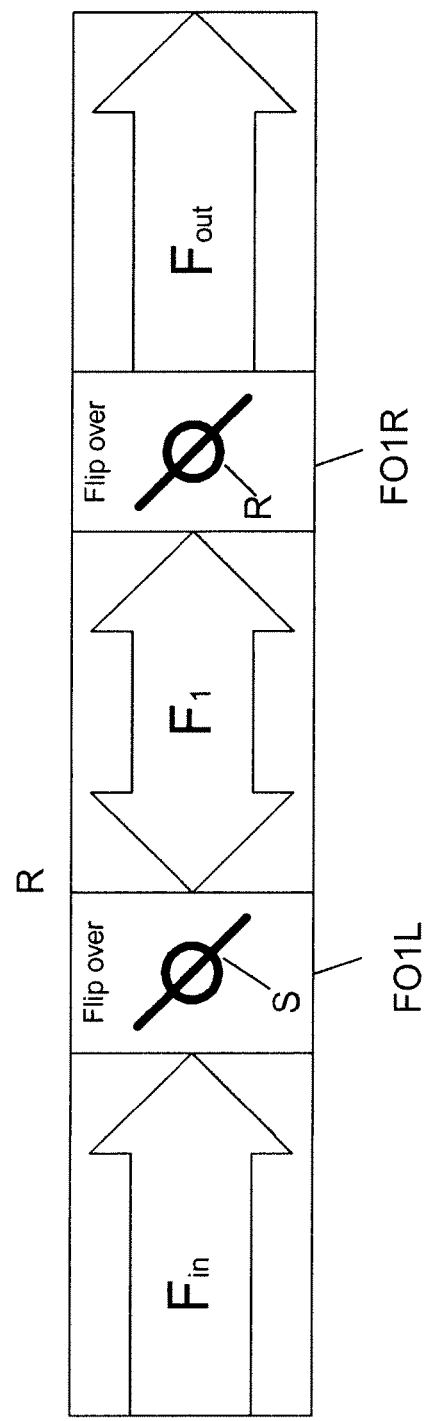

METHOD OF AND APPARATUS FOR PROCESSING AN OBJECT

FIELD OF THE INVENTION

The present invention relates in general to a method and apparatus for processing an object such as a card, workpiece or the like. A potential application of an embodiment of the invention is in the treatment of a card like object, for example a smart card equipped with a chip.

BACKGROUND OF THE INVENTION

Object processing systems for carrying out a number of various processing procedures on objects or work-pieces, such as cards or the like are known. For example processing systems for personalising portable objects such as smart cards including SIM cards, credit cards or telephone cards, as well as electronic purses and the like are known. In a card personalisation system several personalisation operations can be carried out to customise the card to the user. The personalisation operations may include processes for graphical personalisation of the card by relief marking by embossing or stamping, or printing on one or both surfaces of the card as well as processes for electronic personalisation of the card by transferring data to and from the memory of the card. A personalisation operation for graphically marking cards typically uses a marking device such as a laser marking machine to mark graphical data on the card. The graphical data may for example include text such as the name of the bearer of the card, a serial number or code, a bar code, a photograph or drawings or other patterns or codes on the cards. A laser marking machine, for example, generally includes a marking element such as a laser engraver, a marking location for placing a card to be marked opposite to the marking element, a transfer path to supply the card to be marked to the marking location and to remove the cards already marked from the marking location. A personalisation operation for electronic customisation of a card provided with a programmable smart object such as a chip typically involves transferring electronic data from a database to a smart object which is accessible via one or both sides of the card.

Some personalisation processes may include a step for verifying the cards at the end of the personalisation process. Typically the personalisation processes are carried out sequentially on a series of cards which are fed to a personalisation machine.

Such machines typically include a number of processing units arranged one after the other in a line so that an object can be processed in one unit and then conveyed to the next unit in line for another processing procedure. For example a card personalisation machine may include a unit for graphical marking the card, followed by a unit for electronically processing the card followed by a unit for verifying the graphical and electronic personalisation processes, the said units being arranged sequentially one after the other.

Desktop systems for processing cards are typically small machines dedicated to perform only a few processes. While such desktop systems have advantages in terms of footprint, power consumption and price, they are limited in terms of the rate of processing throughput and versatility. One desktop system is dedicated to one main application.

In addition to desktop systems there are the so called Central Issuance machines which are able to carry out several processing procedures on an object within a short time so that a high throughput can be achieved. These machines are however limited in terms of expansion in response to new applications or requirements.

The present invention has been devised with the foregoing drawbacks in mind.

SUMMARY OF THE INVENTION

To better address one or more of the foregoing concerns, a first aspect of the invention provides an object processing machine for processing a plurality of objects in series, the machine comprising: a plurality of processing modules, each processing module having a modular structure co-operable with the modular structure of another processing module of the plurality of processing modules to form a modular assembly constituting the object processing machine; each processing module being operable to perform a corresponding processing operation on an object and being provided with at least one transfer unit located at a respective port of the processing module; each transfer unit being arranged to transfer an object to or from the corresponding processing module and/or to or from a transfer unit of another processing module of the modular assembly; the transfer units being arranged to co-operate with one another and/or with another processing unit such that objects can be guided from an input of the machine to an output of the machine via a plurality of different transport pathways through the machine, wherein the transport pathway taken by a said object being processed corresponds to the pre-determined processing operations to be performed on the said object.

In some embodiments of the invention the transport pathway taken by an object through the machine may depend on the actual operational status of the machine; for example the number of objects being currently processed by the machine or the current processing operations being carried out by the machine on other objects. The transport pathway may be selected to optimise the performance of the whole system. The performance can be distinguished by the maximum throughput, a reduced power consumption or a minimum consumption of supplies such as ink, ribbon or the like when using processing modules carrying out the same operation with different qualities by using different amount of supplies.

A transport path of the object between two object processing modules is not necessarily congruent with the path used during processing of the objects, wherein the transfer units are capable of guiding the objects via an optimised transport pathway out of several possible ways through the object processing machine according to a predefined set of rules corresponding to the object being processed and the actual status of the machine.

It will be appreciated that the input and the output may be the same unit performing both functions or separate units, one acting as input, the other acting as an output.

A second aspect of the invention provides a method of processing a plurality of objects in an object processing machine, the object processing machine comprising: a plurality of processing modules, each processing module having a modular structure co-operable with the modular structure of another processing module to form a modular assembly constituting the object processing machine and being provided with at least one transfer unit located at a respective port of the processing module; the method comprising: receiving a first object to be processed; transferring the first object to be processed to a first processing module via a first transfer unit of the first processing module; processing the first object according to a processing operation for the first object; transferring the first object from the first processing module to a transfer unit of a second adjacent processing module so that the object can be processed by the second adjacent processing module or, alternatively, transferred directly to the transfer unit of a third processing module adjacent to the second processing module; wherein the object is transferred between transfer units of the processing modules via one of a plurality of transport pathways between an input and output of the machine according to a predefined set of rules corresponding to the object being processed such that the object may be processed by all or alternatively by a subset of the processing modules constituting the said object processing machine Following objects will be processed in a similar way taken into account the set of processes assigned to the objects and the actual status of the machine given by the functionality of the processing modules and the foregoing objects.

In embodiments of the invention:

the plurality of transport pathways through the machine includes a transport pathway by which a said object to be processed passes through all of the processing modules constituting the said object processing machine, and another transport pathway by which the said object to be processed passes through a subset of the processing modules constituting the said object processing machine.

the transport pathway for a said object may depend on the actual operational status of the object processing machine.

the transfer units may be arranged to co-operate with one another such that an object can by pass a said processing module via the corresponding transfer unit of the said processing module without being transferred into the said processing module, the object being processed being transferred from one processing module to another processing module of the modular assembly by means of the transfer units according to a predefined set of rules corresponding to the object being processed.

at least one port of each processing module can act interchangeably as an input port or an output port, such that an object can be moved bi-directionally through the object processing machine.

each processing module is interchangeable within the modular structure with another processing module.

each processing module can be removed and replaced independently of the other processing modules.

the processing modules may be arranged side by side and on top of each other in a two dimensional modular array.

each processing module may be provided with a corresponding control unit to control the processing and transfer of a said object in the corresponding module according to the said object.

each processing module is further operable as a stand-alone machine tool.

the machine tool is provided with a power base for supplying power to each of the processing modules, each processing module being provided with an inter-cooperative power interface for co-operating with the power base or another inter-cooperative power interface for transferring the power supply from the power base to another processing module.

an object being processed can by pass a said processing module via the corresponding transfer unit of the said processing module without being transferred to the said processing module.

the transport pathway for a said object may depend on the actual operational status of the object processing machine.

the object to be processed can be moved in a first direction and in a second opposite direction through a processing module.

the processing and transfer of a said object is controlled by a respective control unit of the corresponding processing module according to the said object.

the object may be transferred through the object processing machine via one transport pathway selected from a plurality of different possible transport pathways through the plurality of processing modules.

the processing operation performed by a respective processing module can comprise one of graphically marking the object, transferring data to the object, embossing the card or verifying the object, other processing operations and combinations are feasible depending on the requirements of the application.

At least parts of the methods according to the invention may be computer implemented. The methods may be implemented in software on a programmable apparatus. They may also be implemented solely in hardware or in software, or in a combination thereof.

Since at least parts of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIGS. 1A to 1C are schematic diagrams of a SIM card which may be processed to by an object processing machine according to an embodiment of the invention;

FIG. 2C is a schematic view of the basic processing module of FIG. 2A equipped with an input and output unit;

DETAILED DESCRIPTION

Figure 2A:
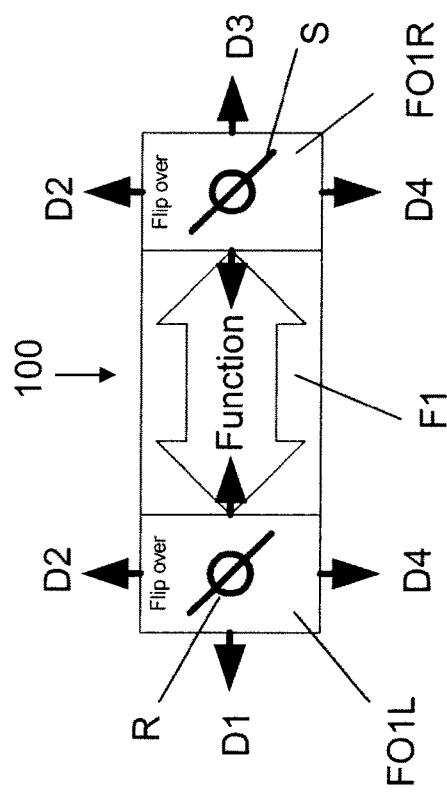
FIG. 2A is a schematic view of a basic processing module according to a first embodiment of the invention.

A method of and apparatus for processing an object according to different embodiments of the invention will be described with reference to FIGS. 2 to 11. In the described embodiments of the invention, by way of example, the method is implemented to personalise a SIM (subscriber identity module) card, illustrated in FIG. 1. It will be appreciated however that methods of the invention may be applied to perform processing operations on other types of portable objects such as credit cards or telephone cards, as well as electronic purses and passport booklets or ID cards and the like. Although the treated objects mentioned above are in the area of identification documents, embodiments of the invention can be applied to other work-pieces requiring various treatments to be performed on it.

Several potential applications of some of the embodiments of the invention involve personalized cards primarily ID1 formatted and containing an electronic storage device. For example, a SIM card is representatively explained as a potential object of application. With reference to FIGS. 1A to 1C a SIM card 80 comprises a SIM chip 81 on a SIM card body 82. The SIM chip 81 includes a memory and communication elements for transferring data between the memory and a mobile terminal or an electronic personalisation device in which the SIM card 80 is inserted. A SIM card is used to identify a subscriber on mobile telephony devices (such as computers and mobile phones) and is generally available in two standard sizes. The first standard size corresponds to the typical size of a credit card. The newer, more popular miniature version such as illustrated in FIG. 1A has a smaller size. Some smaller SIM cards are supplied as a full-sized card 83 with the smaller SIM card 80 being held in place by a few plastic links 84 that can be easily broken off to provide the smaller SIM card 80. A SIM card typically stores a unique International Mobile Subscriber Identity (IMSI) to identify the subscriber to which the card is attributed to. The initial 3 digits of an IMSI represent the Mobile Country Code (MCC), the next 2 digits represent the Mobile Network Code (MNC) and the next 10 digits represent the mobile station identification number. A SIM card as a smart card also has a unique serial number or integrated circuit card ID (ICC-ID) which is generally printed on the SIM card body during the personalisation process of the card. One of the main aims of at least one embodiment of the present invention involves the marking of data on the SIM card body by a graphical marking device. The SIM card has a front surface 801 on which the electrical contacts of the SIM chip 81 are visible and a back surface 802, on the opposite face of the SIM card. Graphical marking where appropriate can be performed on both surfaces 801 and 802 of the SIM card 80.

Nevertheless it will be appreciated that the invention is not restricted to this application, which has been presented as a typical example for the area of operation of the invention.

Figure 2B:
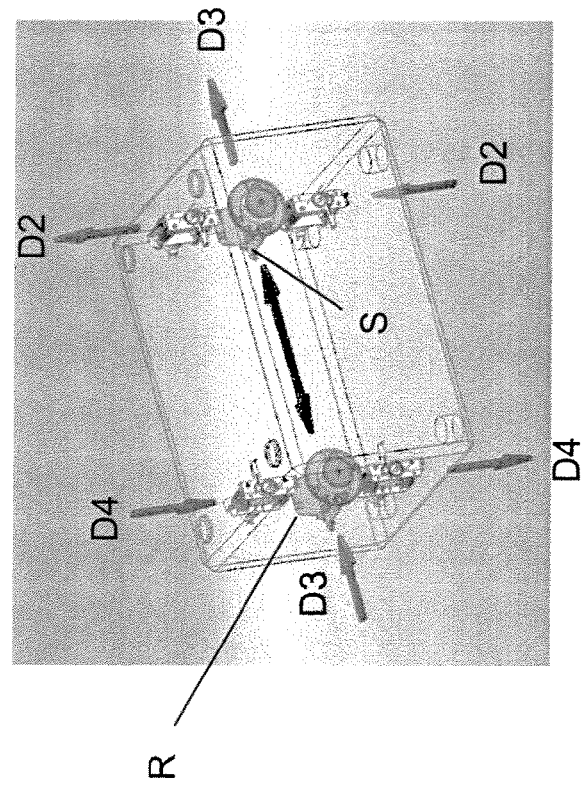
FIG. 2B is a perspective view of the basic processing module of FIG. 2A.

With reference to FIG. 2A and FIG. 2B, a basic processing module 100 for a personalisation machine for performing a personalisation operation on card shaped objects like SIM cards for example according to a first embodiment of the invention includes a processing unit $F_1$ disposed between a first or left flip over unit $FO_{1L}$ and a second or right flip over unit $FO_{2R}$. Each flip over unit $FO_{1L}$ and $FO_{1R}$ is capable of supporting and transporting an object to be processed or which already have been processed in several different directions, preferably at least four directions D1, D2, D3 and D4 perpendicular to each other. For this purpose each flip over unit $FO_{1L}$ and $FO_{1R}$ includes a support S for supporting the object to be processed, the support being rotatable in an anti-clockwise or a clock-wise direction by a rotating mechanism R to a various number of different directions, preferably at least four positions perpendicular to one another.

For example the first or left flip over element $FO_{1L}$ can be arranged to transport an object to be processed by the processing unit $F_1$ in a horizontal direction D3 from left to right to the processing unit $F_1$ from an input, while second or right flip over element $FO_{1R}$ can be arranged to transport the object already processed by the processing unit $F_1$ in a horizontal direction D3 left to right from the processing unit $F_1$ towards an output. Alternatively the second or right flip over unit $FO_{1R}$ can act as an input to the processing unit $F_1$ transporting an object to be processed in a horizontal direction D1 from right to left to the processing unit and the first or left flip over unit $FO_{1L}$ can act as an output from the processing unit $F_1$ transporting the object in a horizontal direction D1 from right to left away from the processing unit $F_1$. Consequently an object can be transported through the processing unit $F_1$ in two opposing directions.

In addition the flip over units $FO_{1L}$ or $FO_{1R}$ can change the transport direction of the objects by rotating the support S by an angle of not necessarily but preferably 90° degrees in order to provide different ways of transportation to the object, for example, in a direction D2 or D4 not necessarily but preferably perpendicular to the direction D1, so that the object may be transferred from the processing unit $F_1$ to different object stacks or other processing units. Similarly the object may be transferred into the processing unit $F_1$ from different object stacks or other processing units, the flip over unit $FO_{1L}$ or $FO_{1R}$ rotates the support in order to receive the object from one out of various directions like D2 or D4 and successively rotate the support not necessarily but preferably 90° to transport the object into the processing unit $F_1$.

With reference to FIG. 2C the basic module of FIG. 2A can be equipped with two ports depicted in the first embodiment as an input unit $F_{in}$ and an output unit $F_{out}$. However it will be not excluded that port $F_{in}$ may act as an output while port $F_{out}$ may act as an input.

Figure 3:
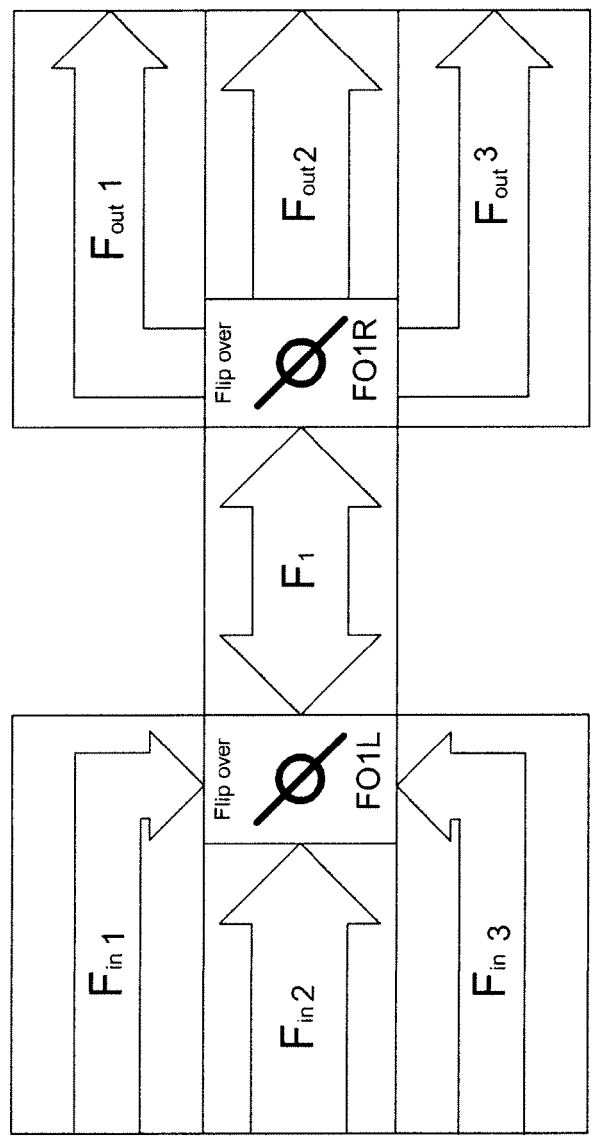
FIG. 3 is a schematic view of the basic processing module of FIG. 2A equipped with a plurality of input and output units.

With reference to FIG. 3, in a second embodiment of the invention the basic module of FIG. 2A may be equipped with a plurality of input ports $F_{in1}$, $F_{in2}$ and $F_{in3}$ and a plurality of output ports $F_{out1}$, $F_{out2}$, and $F_{out3}$. Each input port corresponds to a different position of the first or left flip unit $FO_{2L}$. The flip over units thus offer the possibility of transferring objects to or from different object stacks. For example if the flip over unit $FO_{IL}$ is positioned in a vertical configuration between $F_{in1}$ and $F_{in3}$ it may be used to receive an object via input port $F_{in1}$ or input port $F_{in3}$. If then flip over unit $FO_{1L}$ is then rotated by not necessarily but preferably a right angle in a clockwise or anti-clockwise direction so that support S is orientated parallel to processing unit $F_1$, then the object may be transferred to the processing unit $F_1$ for a processing operation. Alternatively the flip over unit $FO_{1L}$ may initially be in a horizontal configuration enabling an object to be passed from an input unit $F_{in2}$ to the processing unit without any rotation. Similarly each output port $F_{out1}$, $F_{out2}$ or $F_{out3}$ corresponds to a different position of the second or right flip unit $FO_{1R}$. For example if the flip over unit $FO_{1R}$ is rotated by not necessarily but preferably a right angle from a horizontal configuration to a configuration that renders $F_{out1}$ and/or $F_{out3}$ accessible it may be used to transfer a processed object from processing unit $F_1$ to output port $F_{out1}$ or output port $F_{out3}$. Alternatively the flip over unit $FO_{1R}$ may remain in a horizontal configuration enabling an object to be passed from the processing unit $F_1$ directly to an output unit $F_{out2}$ without any rotation.

Figure 4A:
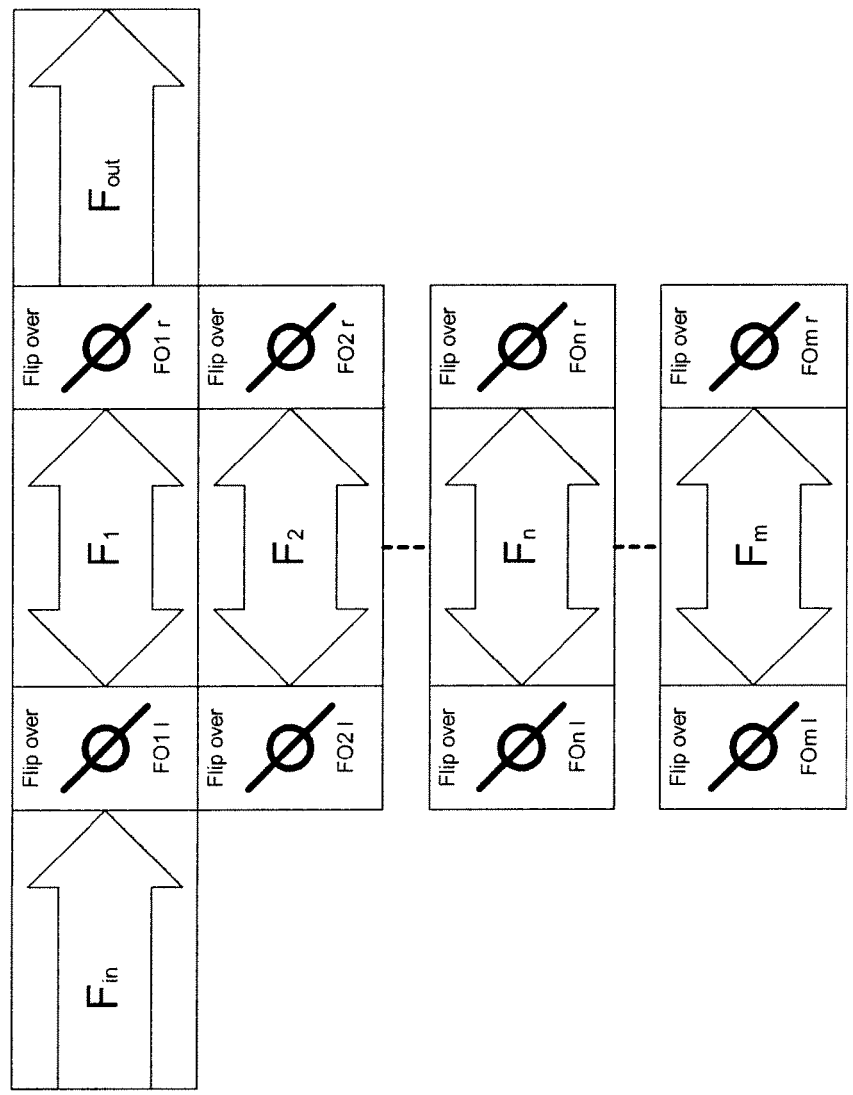
FIG. 4A is a general schematic diagram of an object processing machine according to at least one embodiment of the invention.
Figure 4B:
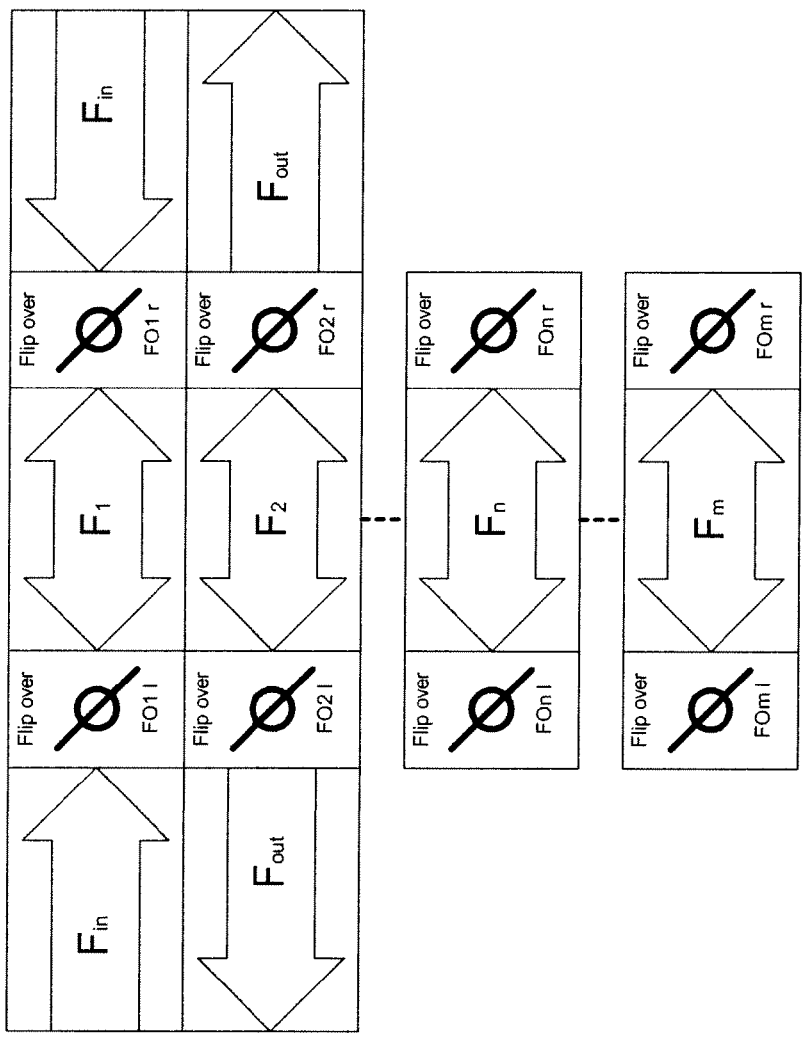
FIG. 4B is a general schematic diagram of an object processing machine according to at least one embodiment of the invention.

In addition to providing an opportunity to select different cards from different input units and distributing into different output units, the Flip over units can be used to distribute the cards into additional processing units as illustrated in FIG. 4A and FIG. 4B. The object processing machine generally illustrated in FIG. 4A includes a plurality of m processing units $F_1$ to $F_m$ arranged in a linear configuration one adjacent to the other, one on top of the other or side by side. A side by side or horizontal configuration can be achieved by rotating the basic unit illustrated in FIG. 2A and FIG. 2B not necessarily but preferably at 90° degrees so that the Flip over units $FO_{1L}$ and $FO_{1R}$ are on top and on the bottom of the functional unit $F_1$. Stacking the so turned basic units, the side by side arrangement will create a horizontal layout of the processing machine. Such configurations enable different processing operations to be performed on the cards using different processing units and give the possibility to enhance the overall processing throughput by doubling processing modules of time consuming processes. Each processing unit $F_n$ is equipped on each of its sides with a first or left flip over unit $FO_{nL}$ and a second or right flip over unit $FO_{nR}$ similar to the module of FIG. 2A. Each row of first or left Flip over units $FO_{1L}$ to $FO_{mL}$ and second or right flip over units $FO_{1R}$ to $FO_{mR}$ can be used to distribute the cards into the appropriate processing unit $F_1$ to $F_m$, and after the processing operation the card may transported to the next free and appropriate processing unit or output stacker $F_{out}$. As illustrated in FIG. 4B the object processing machine may be provided with a plurality of input units and a plurality of output units, so that different cards from different input units can be transferred through the various processing units of the machine to be machined according to the process and to be emitted out via the respective output unit.

The operation of an object processing machine equipped with four processing modules will be explained with reference to FIGS. 5A to 5R. Each processing module includes a first or left flip over unit $FO_{nL}$, a processing unit $F_n$ and a second or right flip over unit $FO_{nR}$ similar to the embodiment of FIG. 2A and the embodiments of FIGS. 4A and 4B. In this particular embodiment the object processing machine is equipped with an input unit $F_{in}$ and two output units: $F_{out}$ and reject output. Each processing module is further equipped with a control unit (not shown) controlling the processing performed by the processing unit of that module and the flip over units of that module. A set of rules implemented on the various modules guide the card to be processed through the processing machine.

Figure 5A:
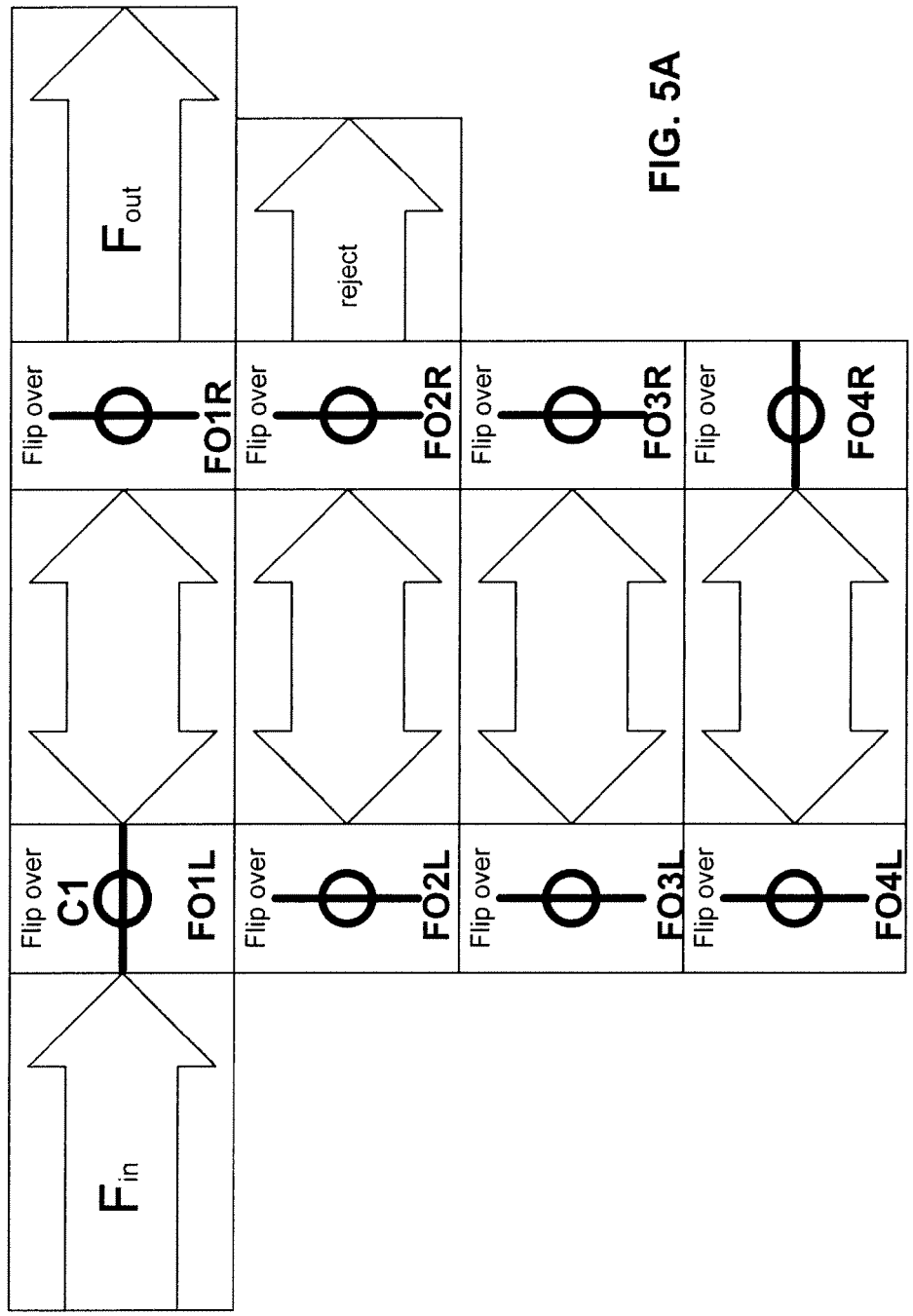
FIGS. 5A to 5R schematically illustrate the operation of an object processing machine according to an embodiment of the invention.
Figure 5B:
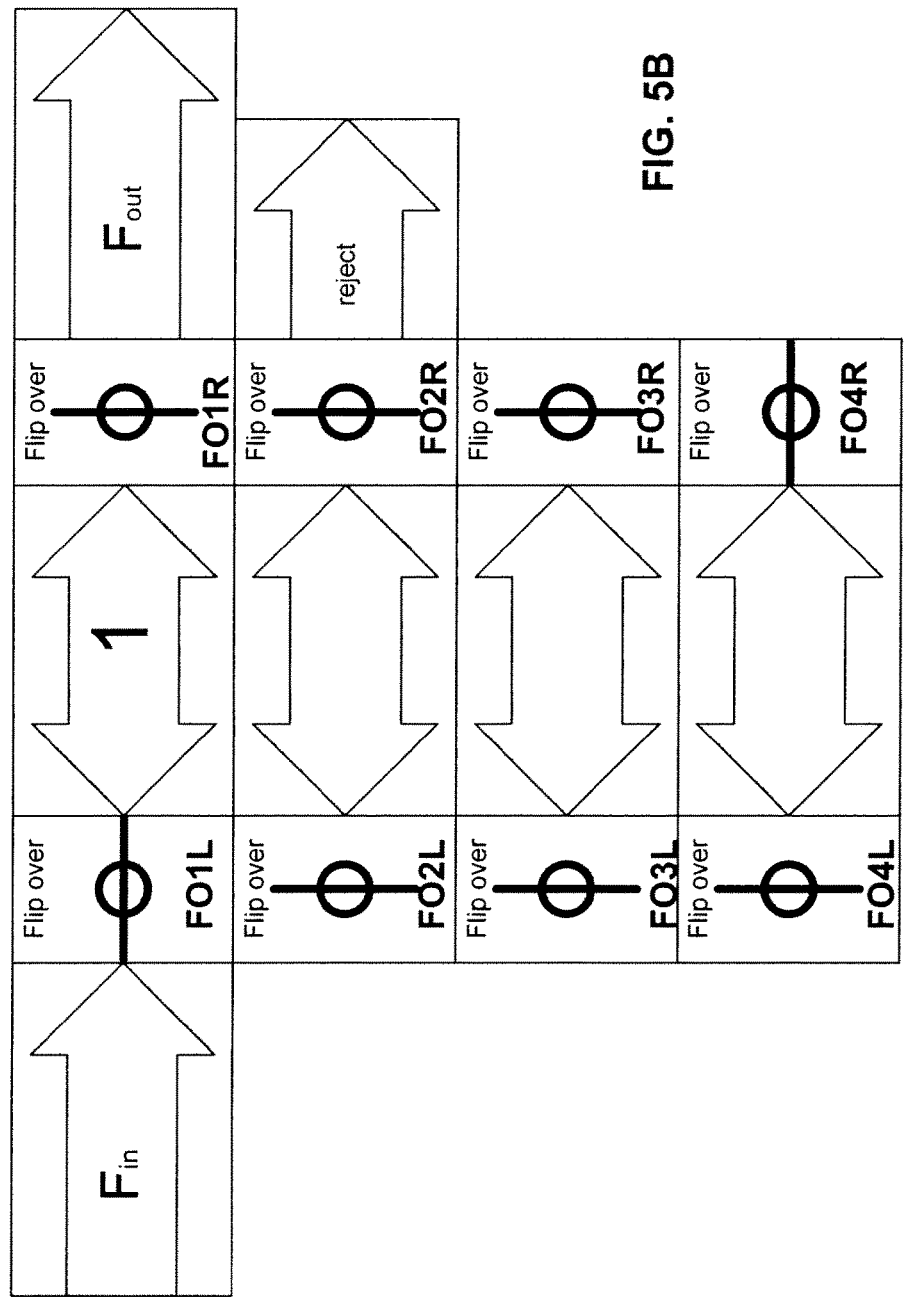
Figure 5C:
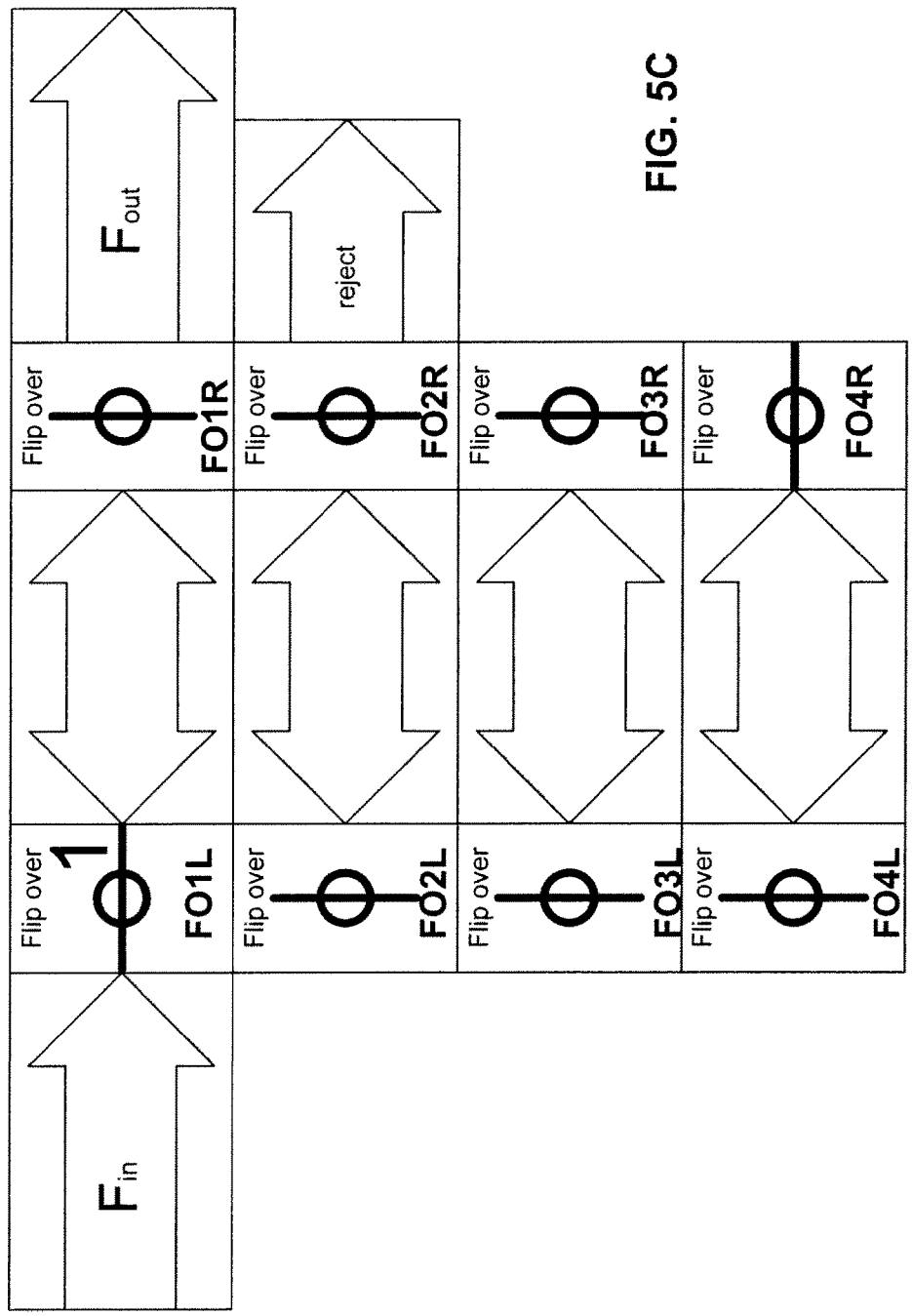
Figure 5D:
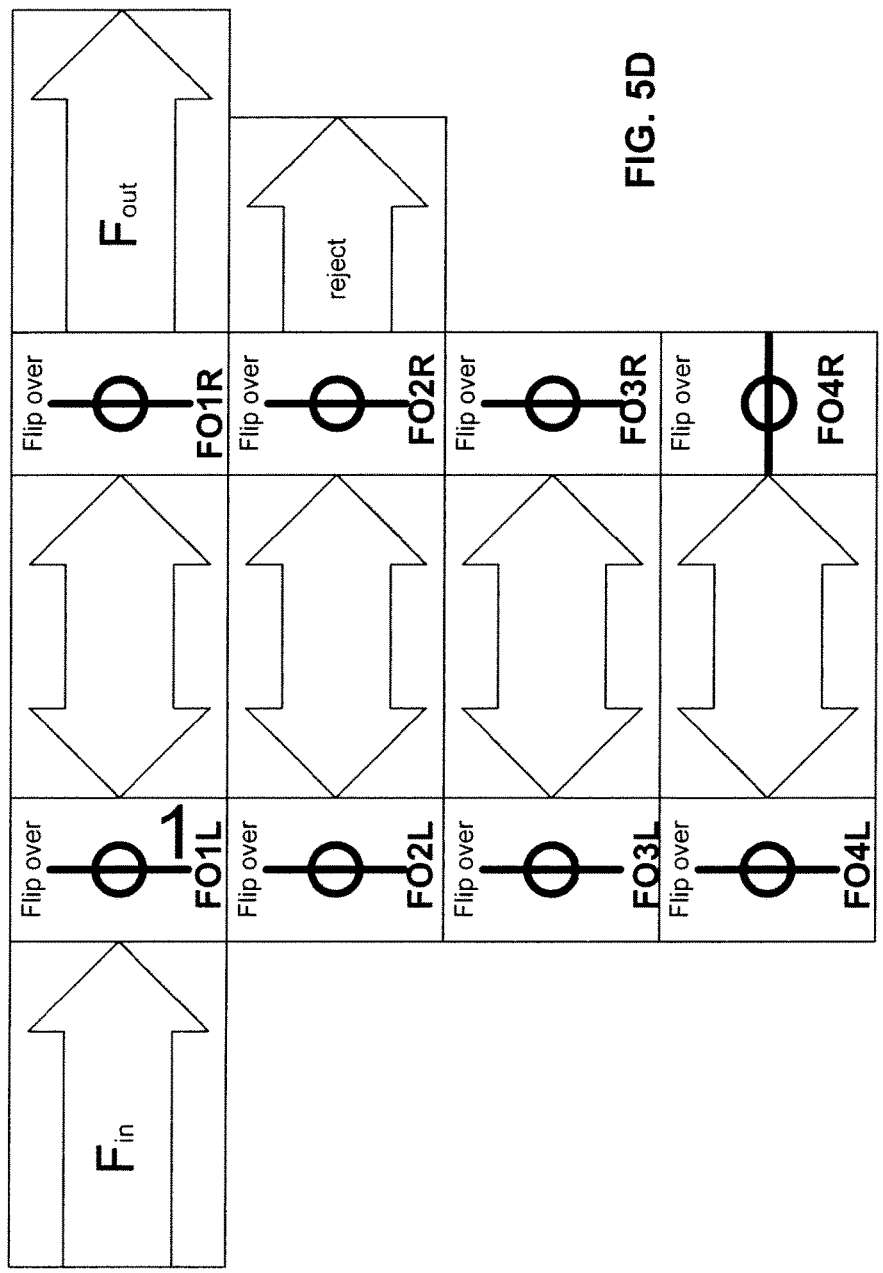
Figure 5E:
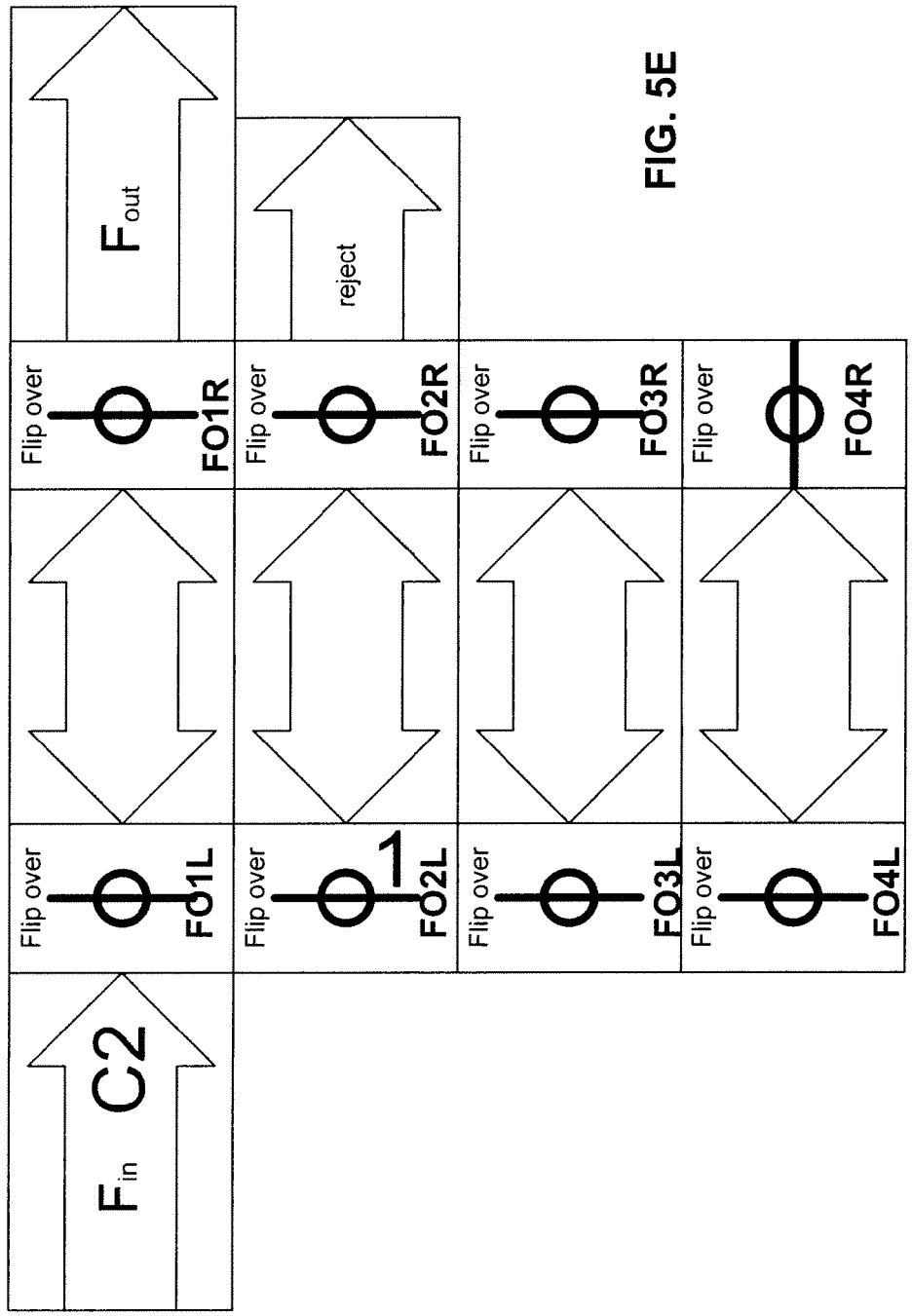
Figure 5F:
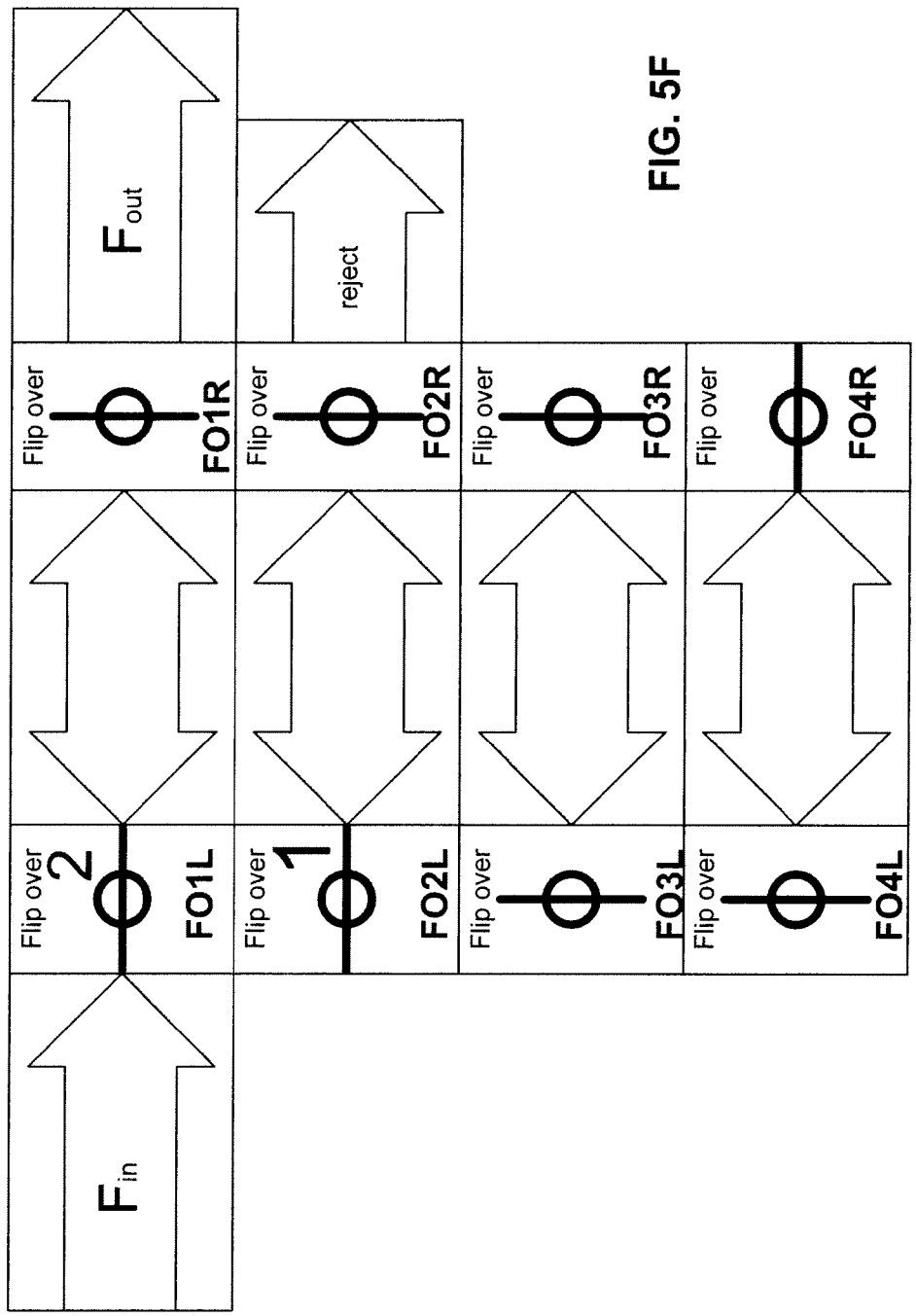
Figure 5G:
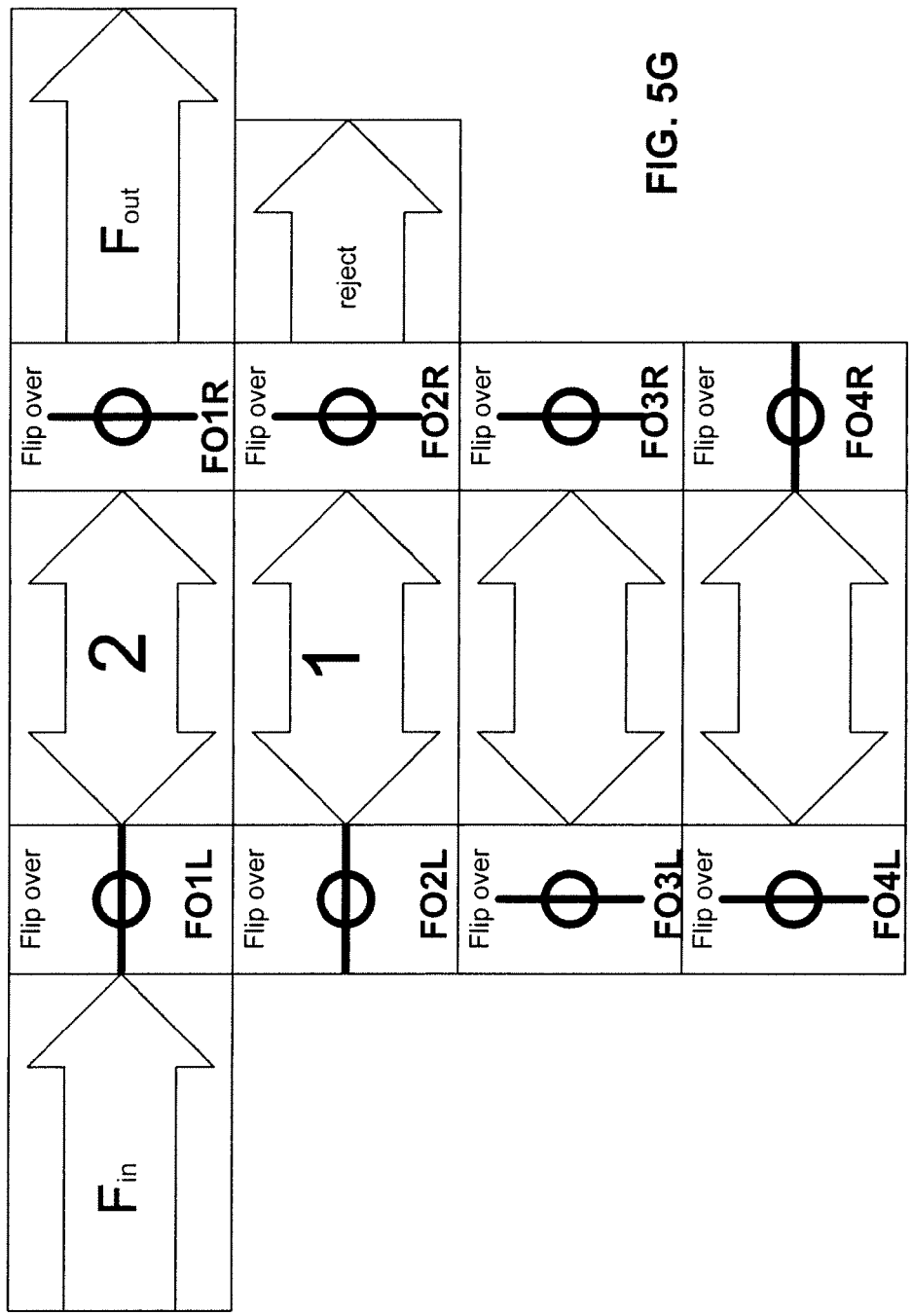
Figure 5H:
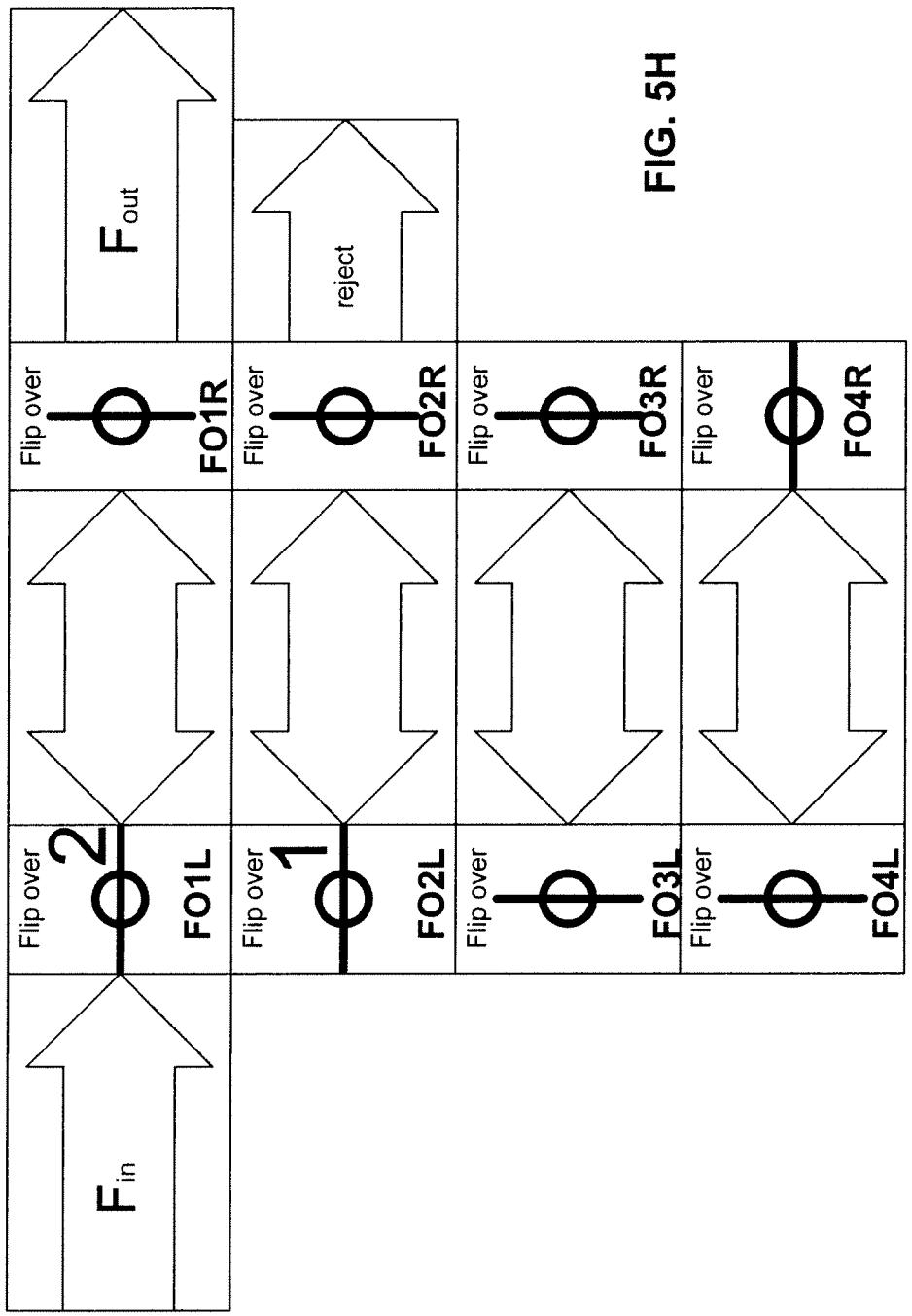
Figure 5I:
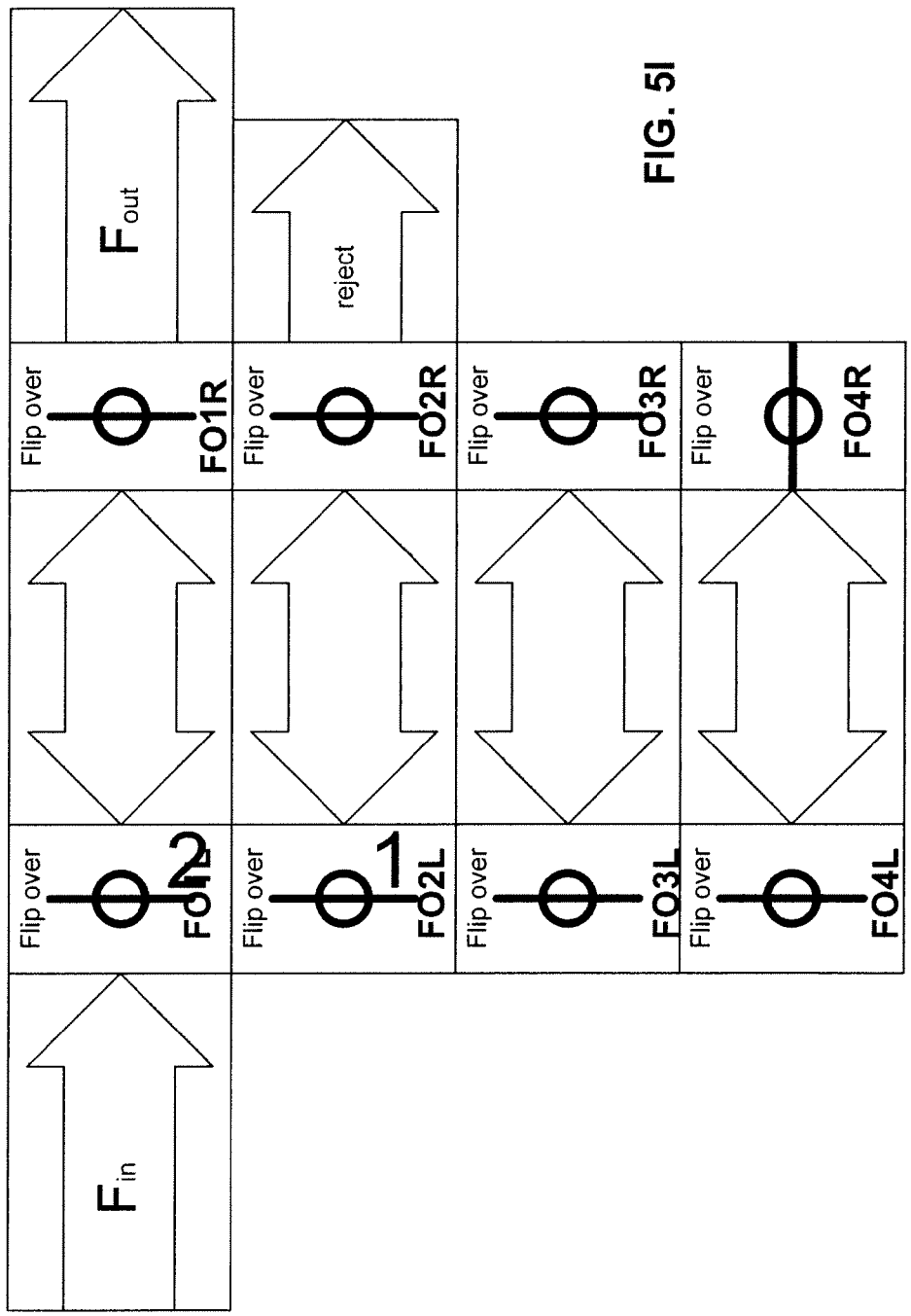
Figure 5J:
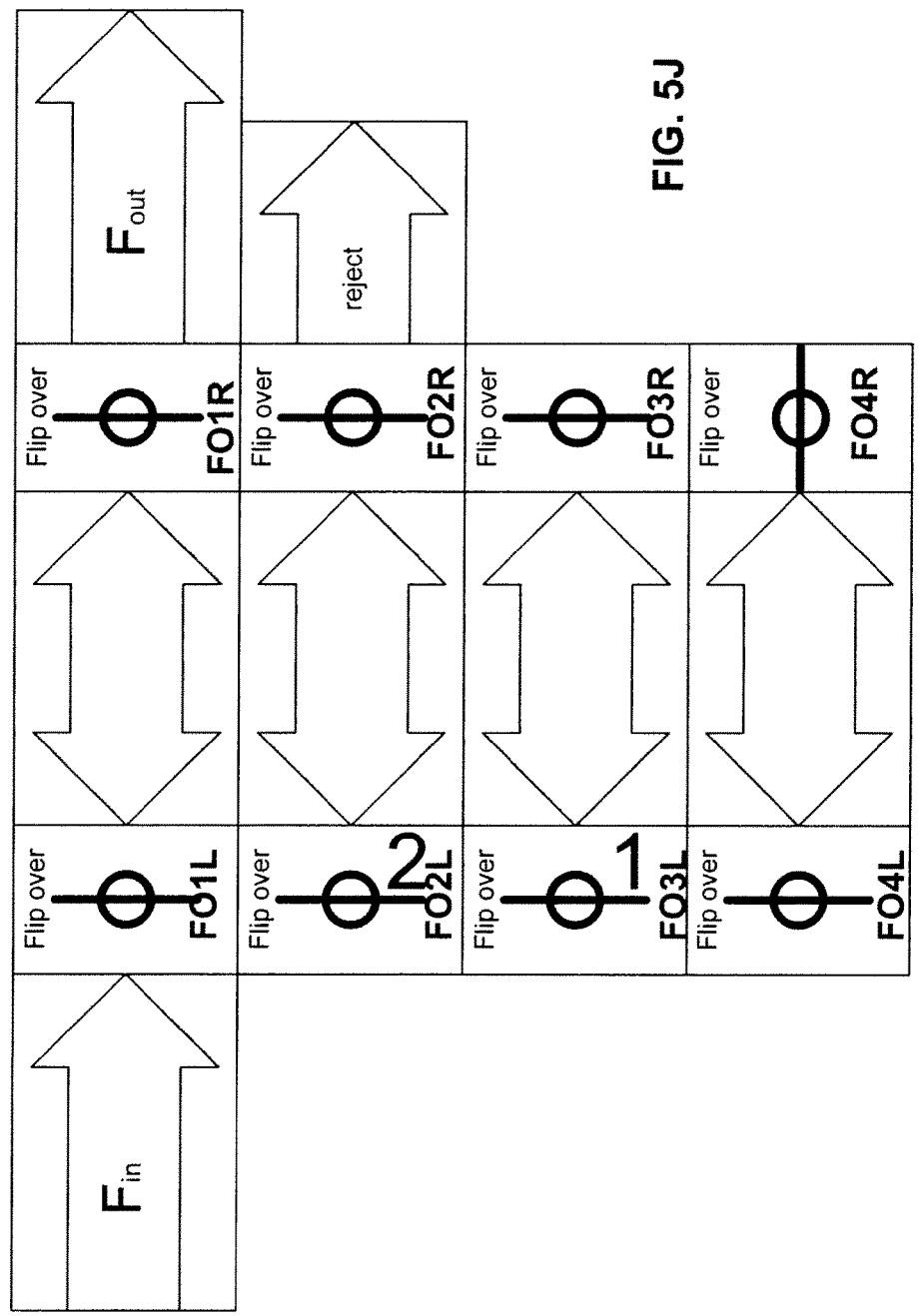
Figure 5K:
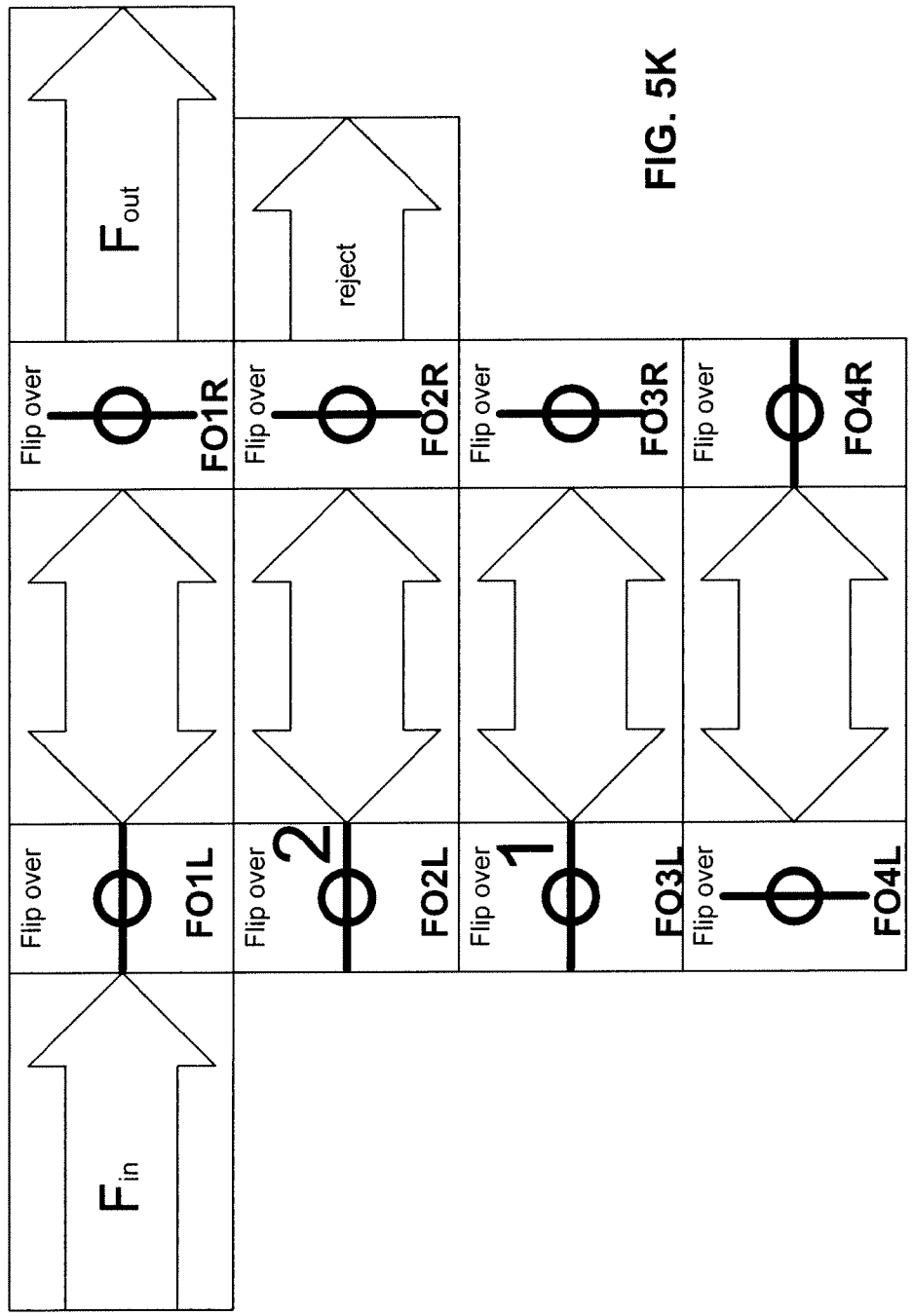
Figure 5L:
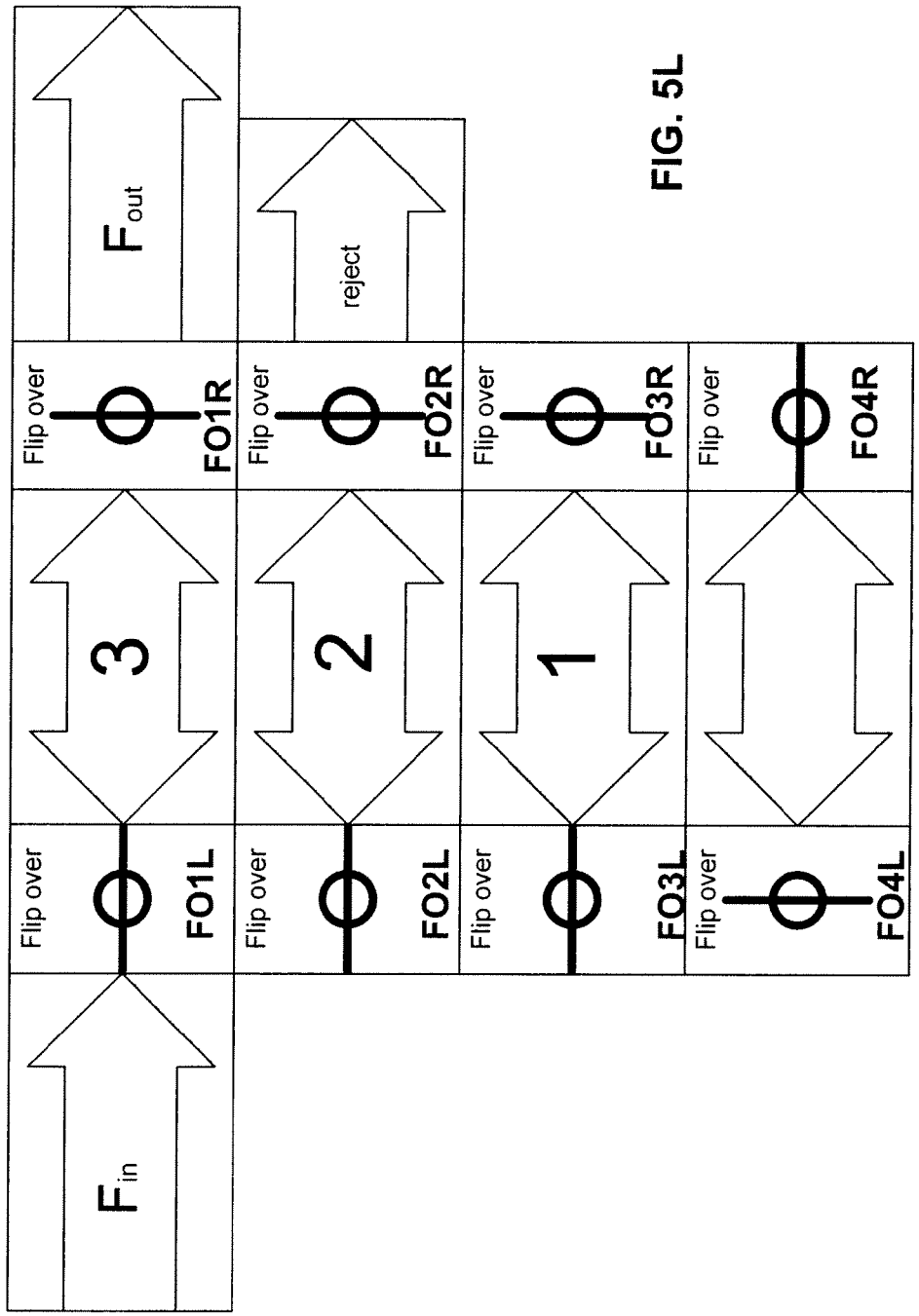

With reference to FIG. 5A in a first step of a processing operation, the left flip over unit $FO_{1L}$ of the first processing module is orientated in a horizontal position to receive the card to be processed from the input unit $F_{in}$ and to transfer the card 1 from left to right in a direction D1 to the first processing unit $F_1$. The card is then processed by the processing module $F_1$ as illustrated in FIG. 5B. The processing operation may be any suitable personalisation operation of the card 1 such as embossing for example. After the processing operation has been completed the card 1 is then moved back from the processing unit $F_1$ to the left flip over unit $FO_{1L}$ of the first module as illustrated in FIG. 5C. The left flip over unit $FO_{1L}$ is then rotated by an angle of 90° in this example to rotate the card 1 on support S from a horizontal direction to a vertical direction as illustrated in FIG. 5D. The left flip over unit $FO_{2L}$ of the second module, located adjacent to the first module, is also orientated in a vertical configuration in order to receive the card 1 from the left flip over unit $FO_{1L}$ of the first module. In this way as illustrated in FIG. 5E the card 1 is transferred from the left flip over unit $FO_{1L}$ of the first module to the left flip over unit $FO_{2L}$ of the second module. Flip over units $FO_{1L}$ and $FO_{2L}$ are then rotated through an angle of 90 degrees to a horizontal configuration as illustrated in FIG. 5F. Flip over unit $FO_{1L}$ of the first module receives the next card 2 from input unit $F_{in}$. In this way the card 1 can be transferred from flip over unit $FO_{2L}$ to the processing unit $F_2$ and card 2 can be transferred from flip over unit $FO_{1L}$ to the processing unit $F_1$ as illustrated in FIG. 5G. The second processing unit $F_2$ may perform an alternative processing function on card 1 such as laser marking of the card 1 while the first processing unit $F_1$ performs an embossing operation on card 2. It will be appreciated that the processes may be carried out simultaneously to speed up the rate of throughput of the cards, or at different times according to the processing requirements. Such a marking operation may involve marking the support 82 of a SIM card for example. The associated information system transmits the marking data to the processing unit $F_2$. The marking data transmitted will correspond to the card 1 being marked. After the corresponding processing operations have been completed cards 1 and 2 are moved from processing unit $F_2$ and $F_1$, respectively back to the corresponding flip over unit $FO_{2L}$ and $FO_{1L}$ which are both in a horizontal position for receiving the respective cards as illustrated in FIG. 5H. Both flip over units $FO_{1L}$ and $FO_{2L}$ are moved through an angle of 90° for instance to a vertical configuration, as illustrated in FIG. 5I so that the cards may be transferred to the subsequent processing unit. Thus as illustrated in FIG. 5J card 1 can be transferred from the left flip over unit $FO_{2L}$ of the second module to the left flip over unit $FO_{3L}$ of the third module and the card 2 can be transferred from the left flip over unit $FO_{1L}$ of the first module to the left flip over unit $FO_{2L}$ of the second module. In the following phase of the process the flip over units $FO_{1L}$, $FO_{2L}$ and $FO_{3L}$ are rotated from a vertical position to a horizontal position as illustrated in FIG. 5K, thereby enabling a third card to be received by flip over unit $FO_{1L}$ from the input unit $F_{in}$ for transfer to the first processing module $F_1$ for an embossing procedure, the second card 2 to be transferred to the second processing module $F_2$ for a laser marking procedure and the first card 1 to be transferred to the third processing module $F_3$ for a third card personalisation process for example electronic personalisation of the card 1 as illustrated in FIG. 5L.

During the electronic personalisation of a card, the electronic personalisation unit $F_3$ transfers the respective personalisation data to the memory of the chip 81 of card 1. Data can be transferred to the memory chip 81 via electrical contacts or strips or via so called contact-less devices such as a radio antenna or an induction system. It will be appreciated that embodiments of the invention may be applied to an electronic personalisation of a card provided with access to one or more memory chips or zones via interfaces provided on both opposing main surfaces of the card.

Figure 5M:
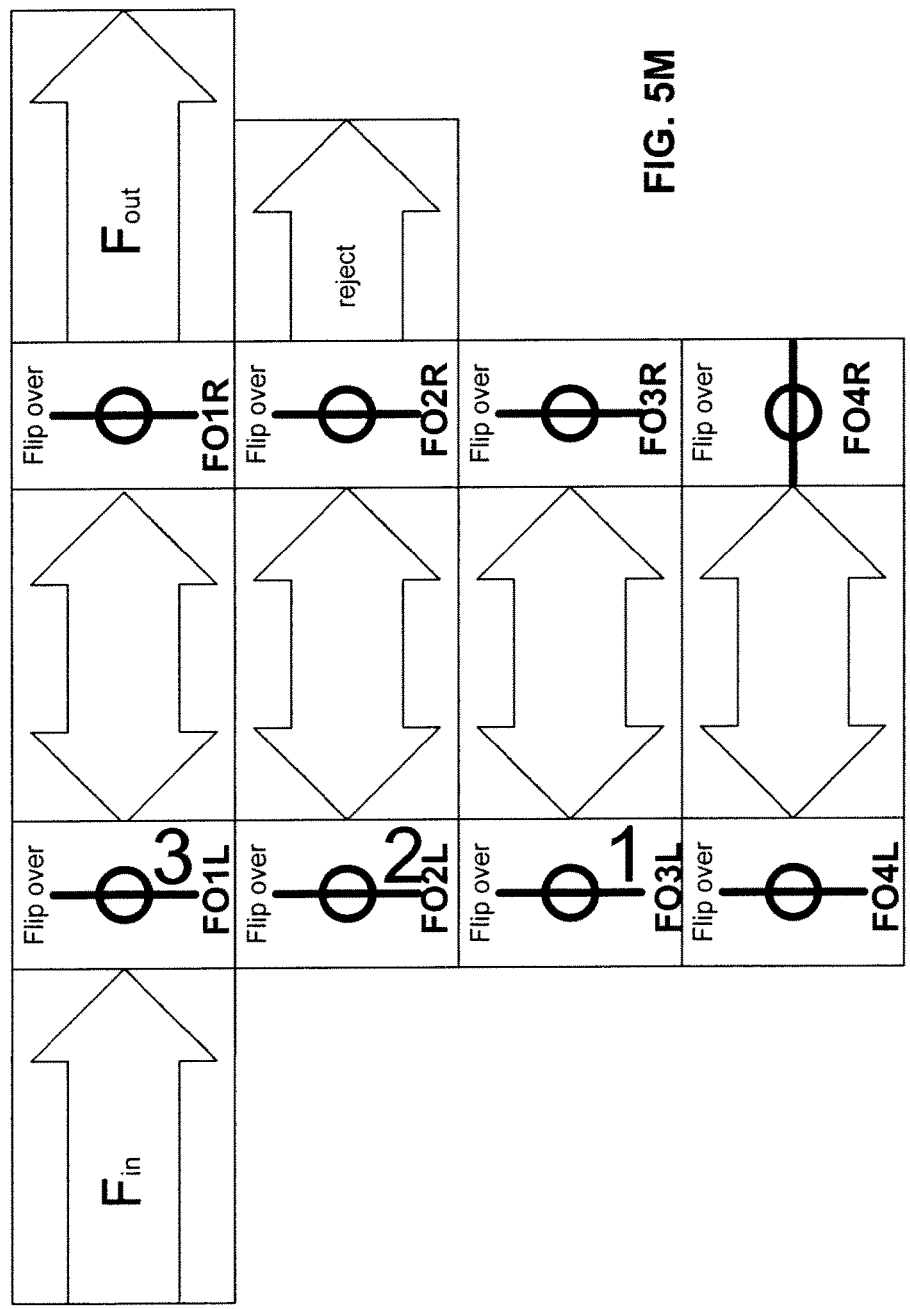
Figure 5N:
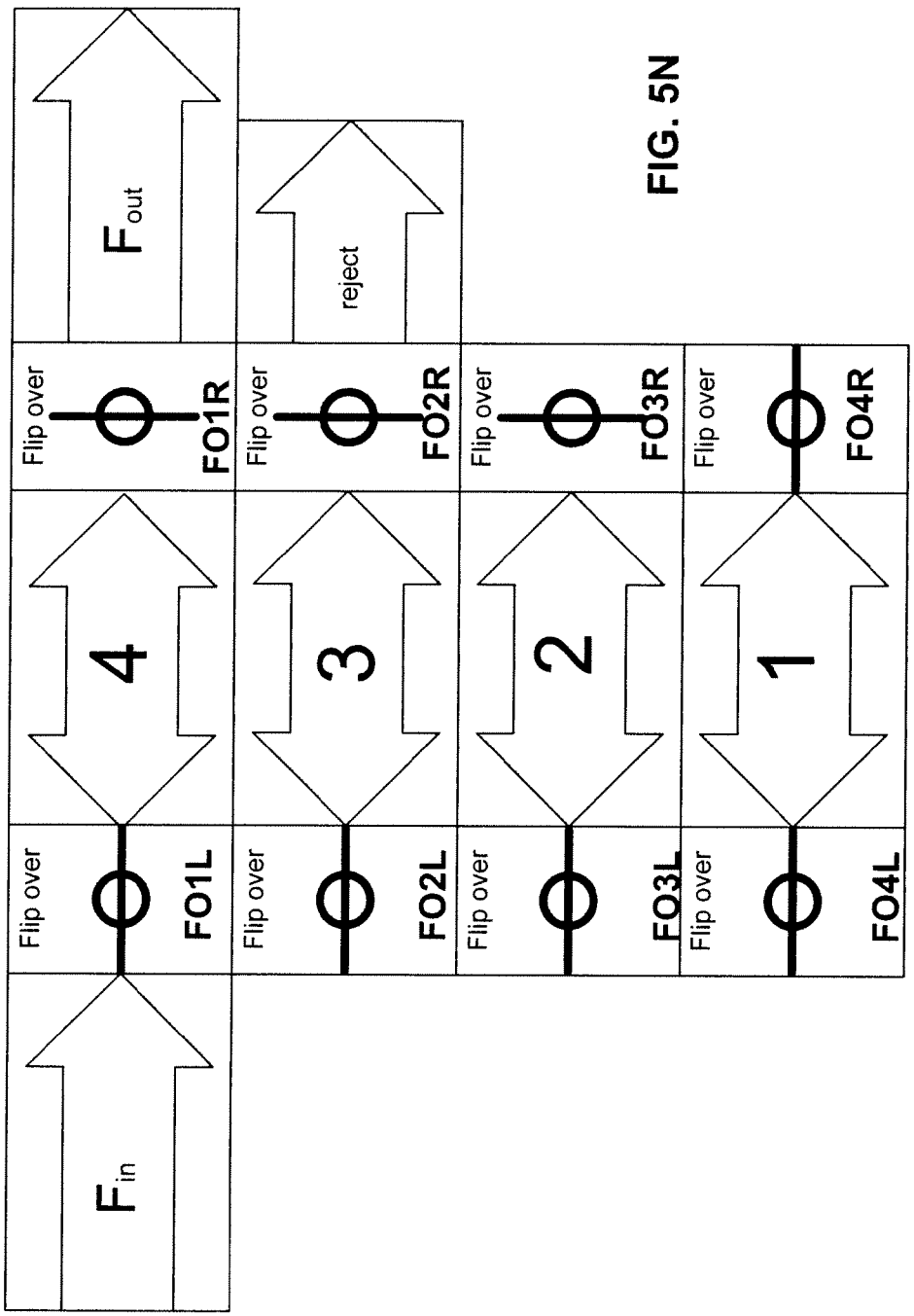
Figure 50:
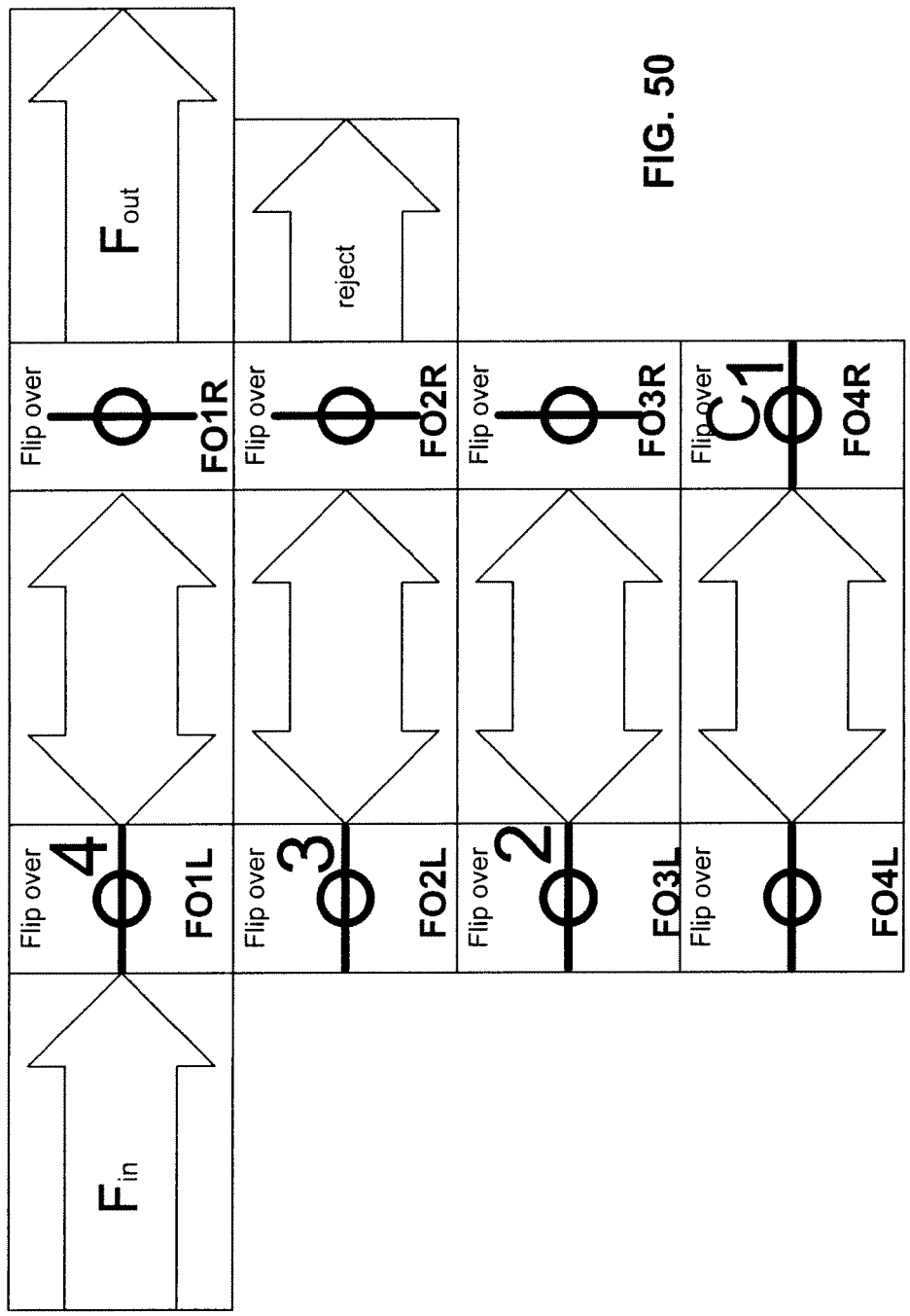

After the respective processing operations have been completed by processing units $F_1$, $F_2$ and $F_3$ the cards 3, 2 and 1 can be transferred back to the respective flip over units $FO_{1L}$, $FO_{2L}$ and $FO_{3L}$, each being initially orientated in a horizontal position for receiving the corresponding card. The flip over units $FO_{1L}$, $FO_{2L}$ and $FO_{3L}$ are then rotated to a vertical position as illustrated in FIG. 5M so that each card can be transferred to the adjacent subsequent flip over unit. In this way card 1 is transferred from the left flip over unit $FO_{3L}$ of the third module to the left flip over module of the fourth module $FO_{4L}$, card 2 is transferred from the left flip over unit $FO_{2L}$ of the second module to the left flip over module of the third module $FO_{3L}$, card 3 is transferred from the left flip over unit $FO_{1L}$ of the first module to the left flip over module of the second module $FO_{2L}$. Each of the left flip over units $FO_{1L}$, $FO_{2L}$, $FO_{3L}$ and $FO_{4L}$ are then moved to a horizontal position so that the cards can be transferred to the respective processing units $F_1$, $F_2$, $F_3$ and $F_4$ as illustrated in FIG. 5N. The left flip over unit $FO_{1L}$ of the first module receives a fourth card 4 from the input unit $F_{in}$ and transfers it to the first processing unit $F_1$. The fourth processing unit $F_4$ may be a verification processing unit verifying that the correct procedures have carried out on the card.

As illustrated in FIG. 5O card 1 is transferred from the fourth processing unit $F_4$ to the right flip over unit $FO_{4R}$ of the fourth module by moving the card 1 in a direction from left to right. The other cards 4, 3 and 2 are moved in opposite direction from the respective processing unit $F_1$, $F_2$ and $F_3$ back to the corresponding left flip over units $FO_{1L}$, $FO_{2L}$ and $FO_{3L}$ so that they may be subsequently passed to the next processing unit.

Figure 5P:
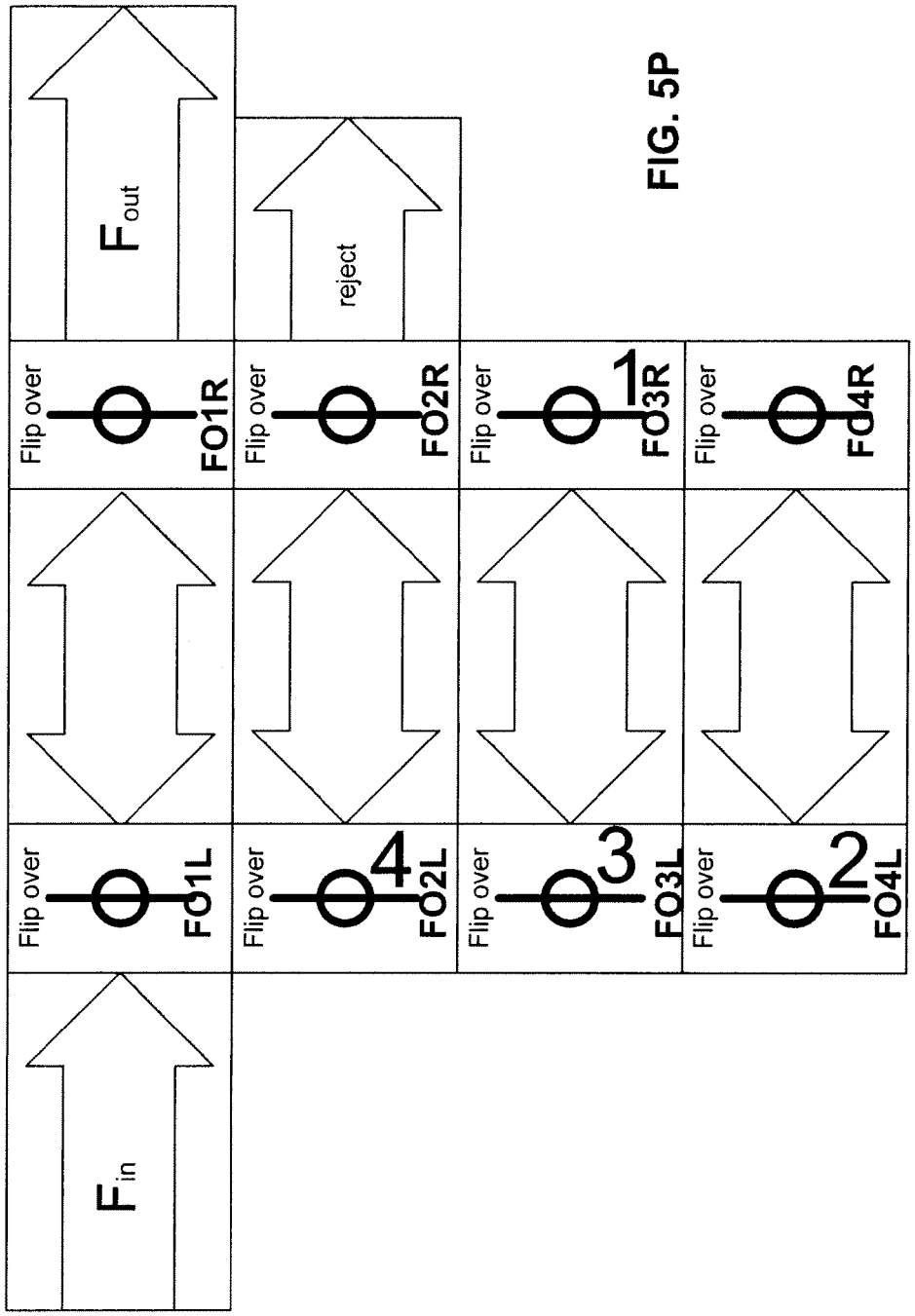

As illustrated in FIG. 5P cards 4, 3 and 2 are rotated through an angle of substantially 90° by their respective flip over unit to a vertical position and transferred to the subsequent flip over unit. Card 1 is rotated to a vertical position and passed from the right flip over unit $FO_{4R}$ of the fourth module to the right flip over unit $FO_{3R}$ of the third module.

Figure 5Q:
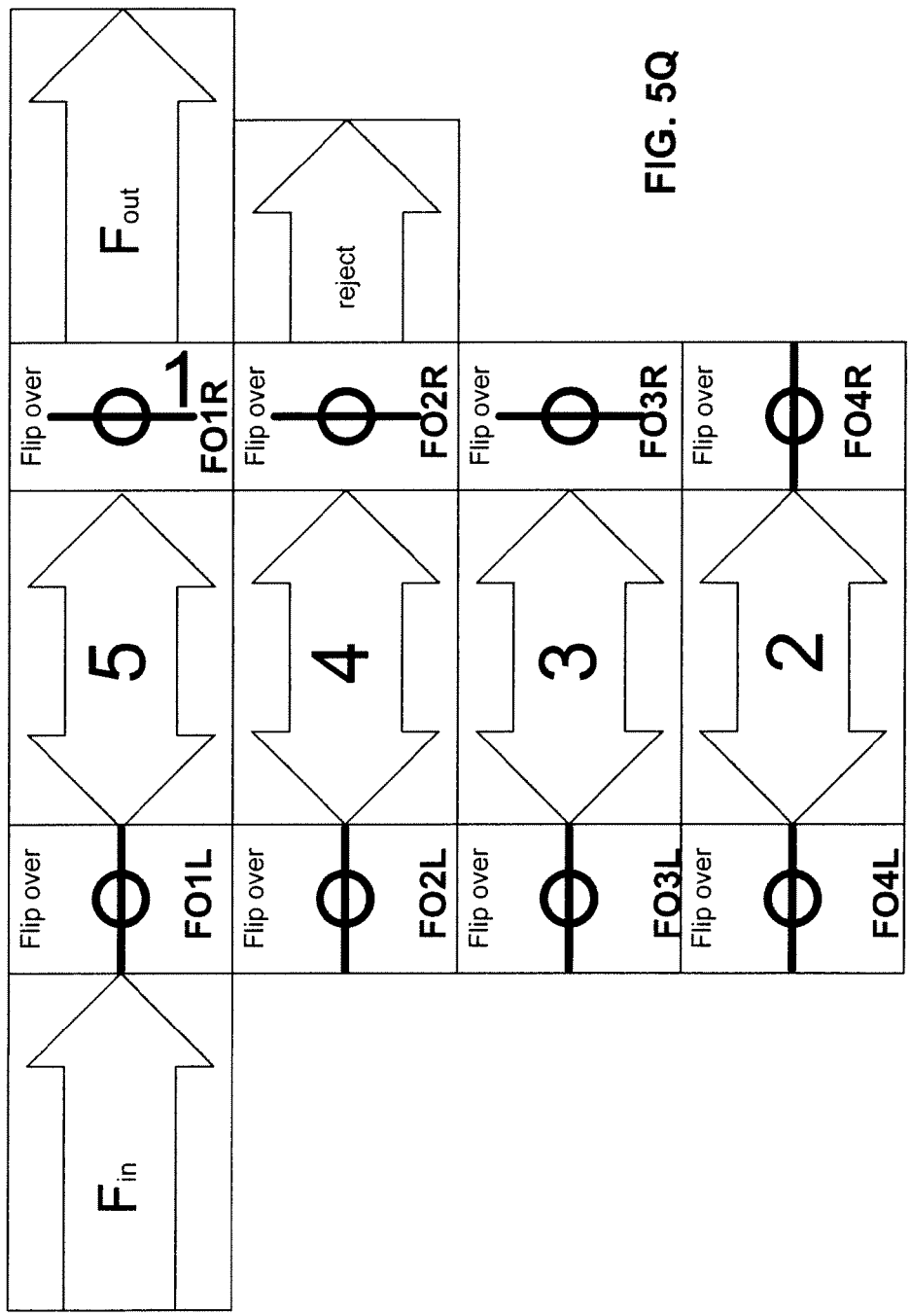

As illustrated in FIG. 5Q cards 2, 3 and 4 are transferred to the next processing unit $F_4$, $F_3$ and $F_2$ of the processing machine via corresponding flip over units $FO_{4L}$, $FO_{3L}$ and $FO_{2L}$ respectively and a fifth card 5 is received by the first processing unit $F_1$. Card 1 which has completed each of the processing operations is transferred via right flip over units $FO_{3R}$ and $FO_{2R}$ from right flip over unit $FO_{4R}$ of the fourth verification module $F_4$ to the right flip over unit $FO_{1R}$ located at the output unit $F_{out}$. As illustrated in FIG. 5R the right flip over unit $FO_{1R}$ of the first module rotates from a vertical position to a horizontal position in order to transfer the card 1 to an output unit $F_{out}$. This happens, if the processed card 1 satisfies the verification carried out by processing unit $F_4$. If the processed card 1 had not satisfied the verification conditions, the card 1 would have been transferred to the reject output by rotation of the right flip over unit $FO_{R2}$ of the second module $F_2$ from a vertical position to a horizontal position.

Figure 5R:
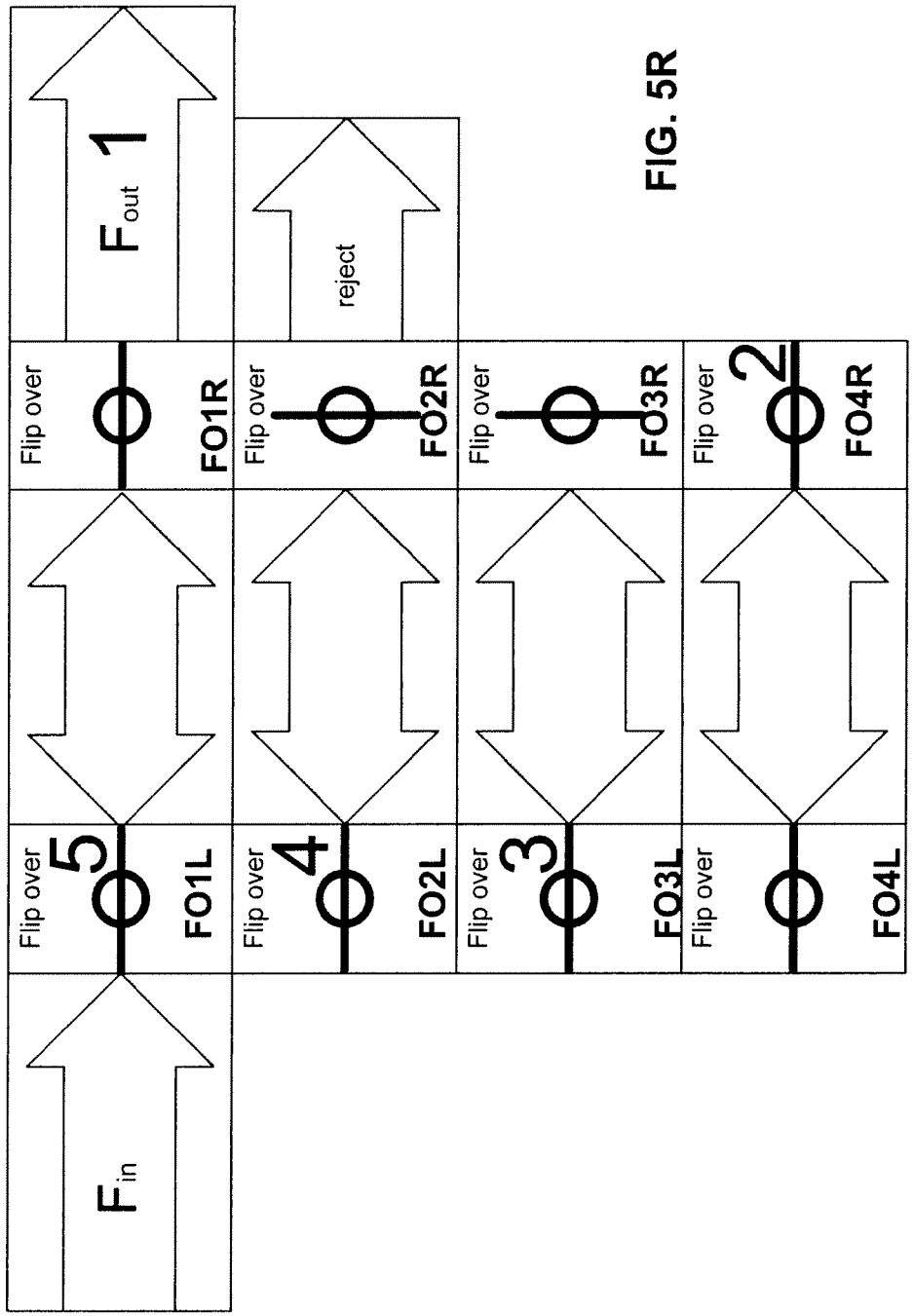
Figure 6:
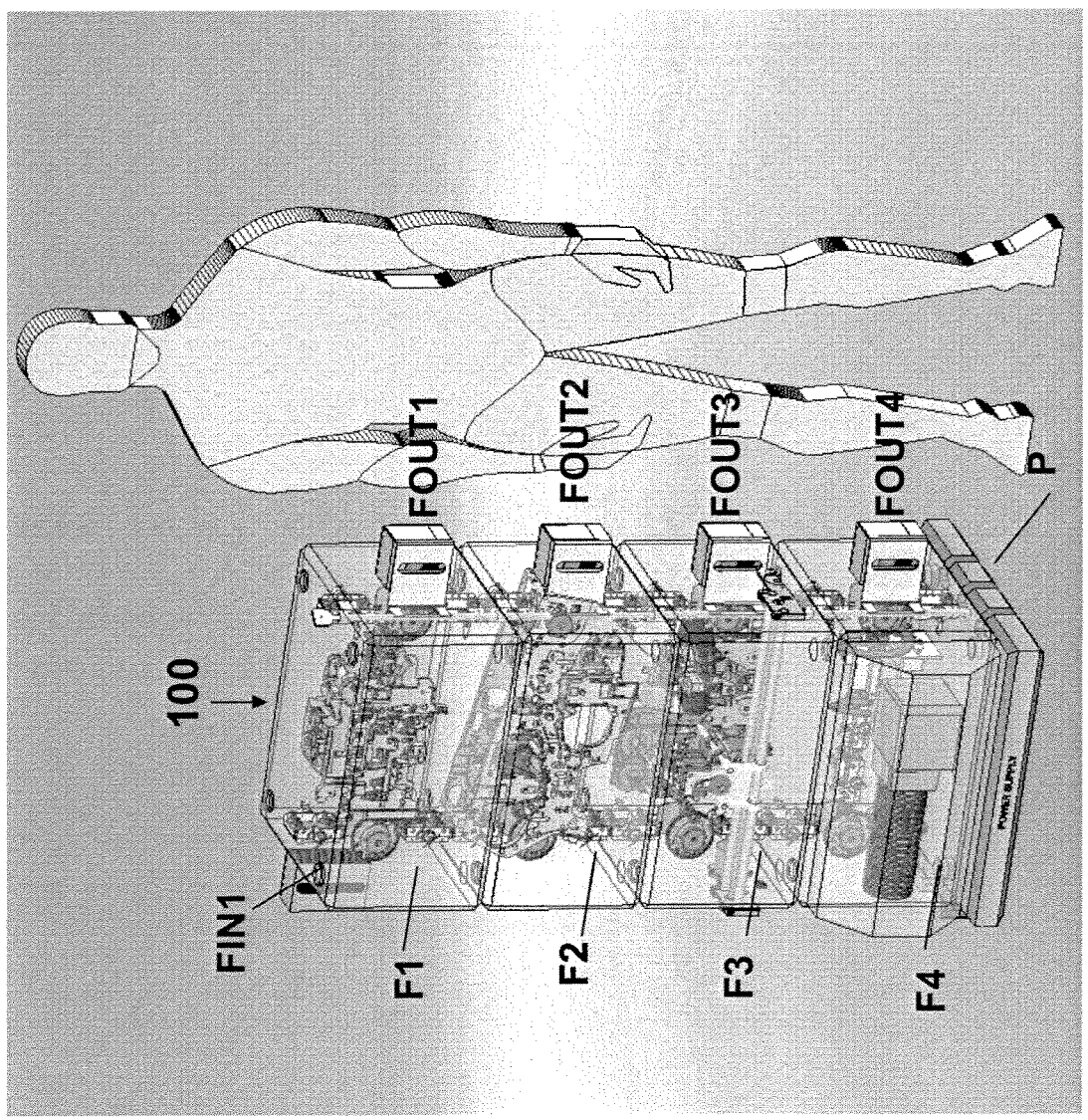
FIG. 6 is a perspective view of an object processing machine according to an embodiment of the invention.

FIG. 6 is a perspective view illustrating the embodiment of FIG. 5A-5R in which the modules are stacked one on top of each other in order to form an assembled tower-like structure constituting the object processing machine. One side of the assembled tower is provided with a card input/output stack unit while the opposing side of the tower is provided with four input/output stack units, one on each module. Thus in this way, for example, a set of cards to be processed may be introduced via an input unit on one side of the unit. The cards can then be processed according to four different procedure sequences, with the cards being processed by different units or according to different processing techniques carried out by the same unit so that four kinds of cards are created, each output stack corresponding to a processing sequence or processed card type.

The base of the object processing machine is provided with a power supply for supplying power to each of the processing modules located above the power supply. The lower processing module can be inserted into the power base by means of a power interface connection in a plug and play like manner with power being transmitted to each of the modules via the power interfaces of the processing modules disposed between the respective processing module and the power module. The added weight of the modules piled one on top of the other helps to strengthen the power connection The configuration of modules illustrated in FIG. 6 provides a simple linear modular structure. It is conceivable that while the embodiment of FIG. 6 is presented as a vertical structure the modules may be arranged side by side to form a horizontal structure.

Figure 7:
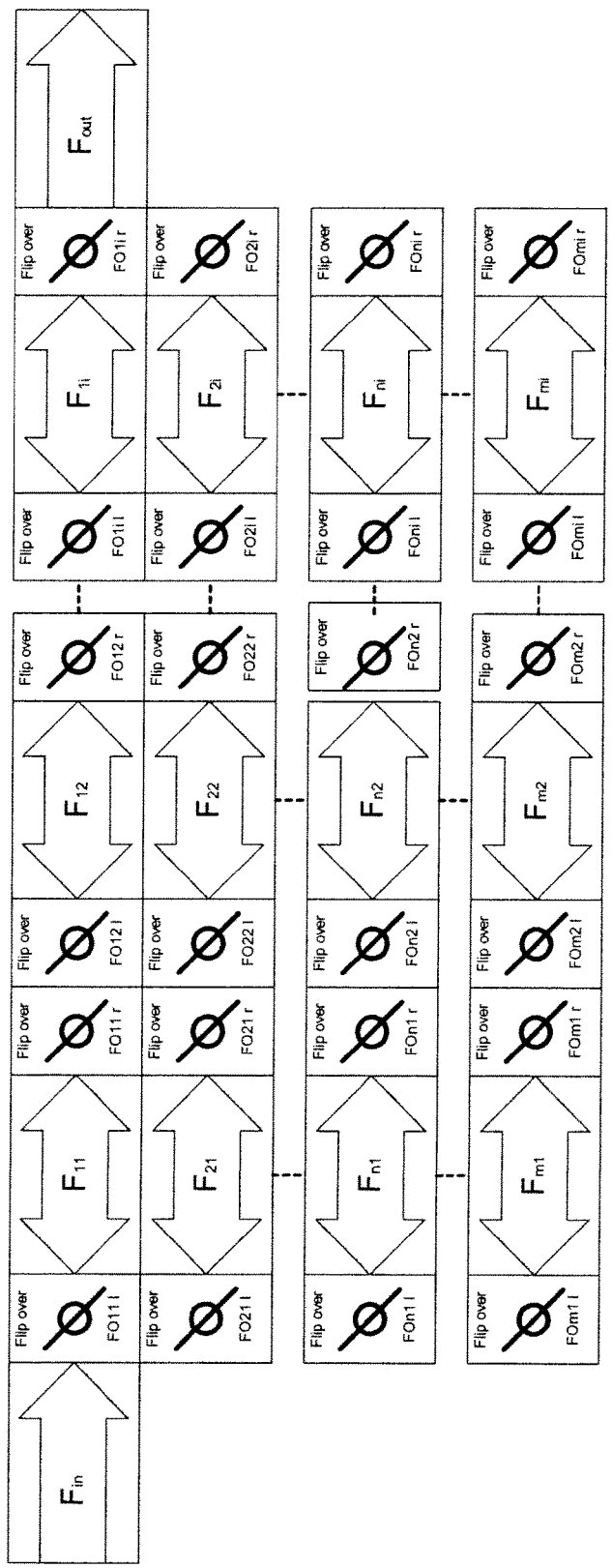
FIG. 7 is a general schematic diagram of an object processing machine according to a further embodiment of the invention.
Figure 9:
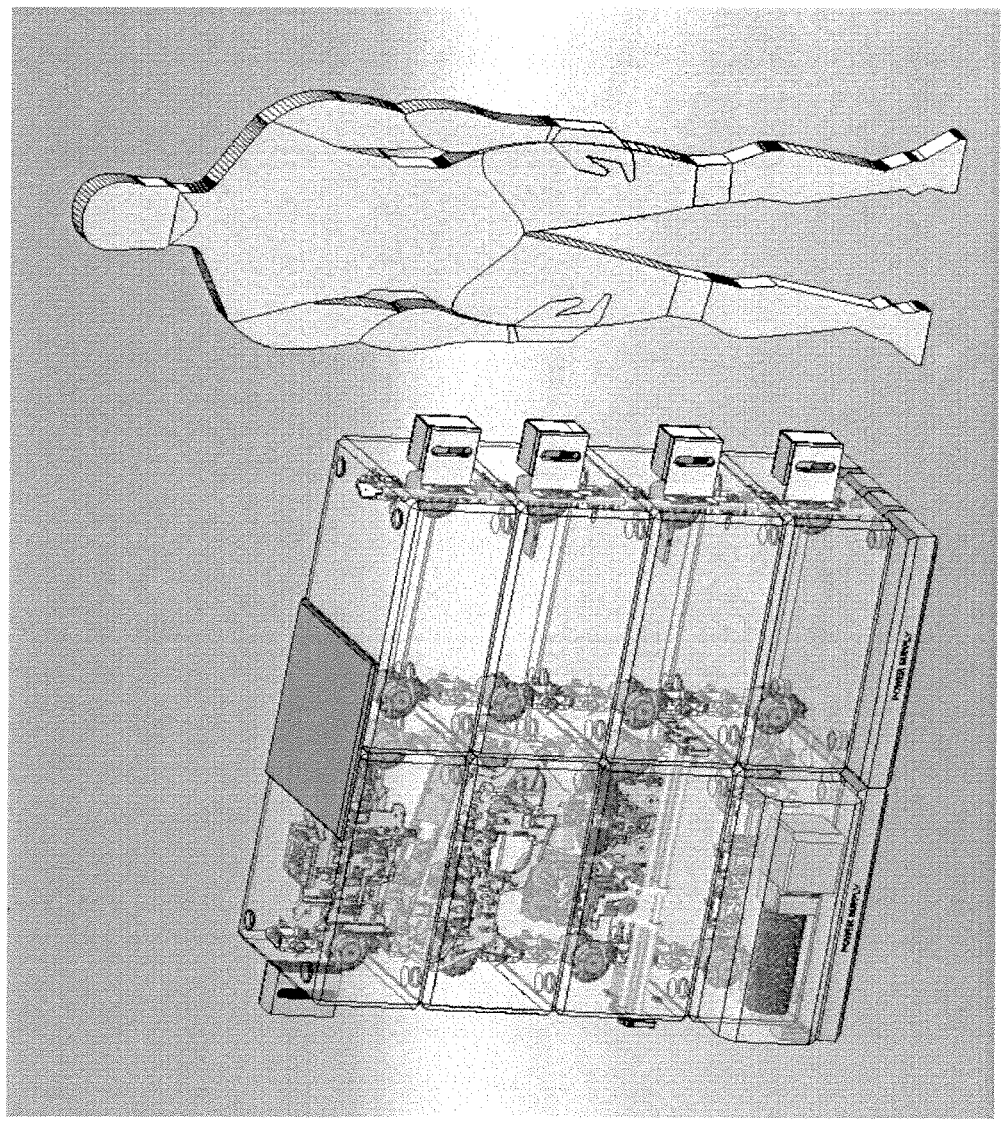
FIG. 9 is a perspective view of an object processing machine according to a further embodiment of the invention.

The modular concept, in which a plurality of individual processing modules can be built together to form a card processing machine, enables further machine enlargement for higher throughput or additional processing functions. According to further embodiments of the invention, it is possible to stack several linear arrays of processing modules together to build up a two dimensional matrix of basic modules. FIG. 7 illustrates such a general modular structure constituting a processing machine structure made up of a plurality m of rows of modules arranged in a plurality i of columns. A combination of various processing operations and/or a multiplication of a particular processing operation may be easily achievable. If such a structure is made up of a number of basic modules as illustrated in FIG. 2A a double row of transport (Flip over) elements will be formed between the rows of processing units. The advantage of such a configuration is its high flexibility which enables each processing unit to be supported individually and the provision of additional areas for buffering cards, work-pieces or objects being processed. FIG. 9 is a perspective view of a 2D array of modular processing units according to an embodiment of the invention in which two columns of four rows of modular units forms an object processing machine.

Figure 8A:
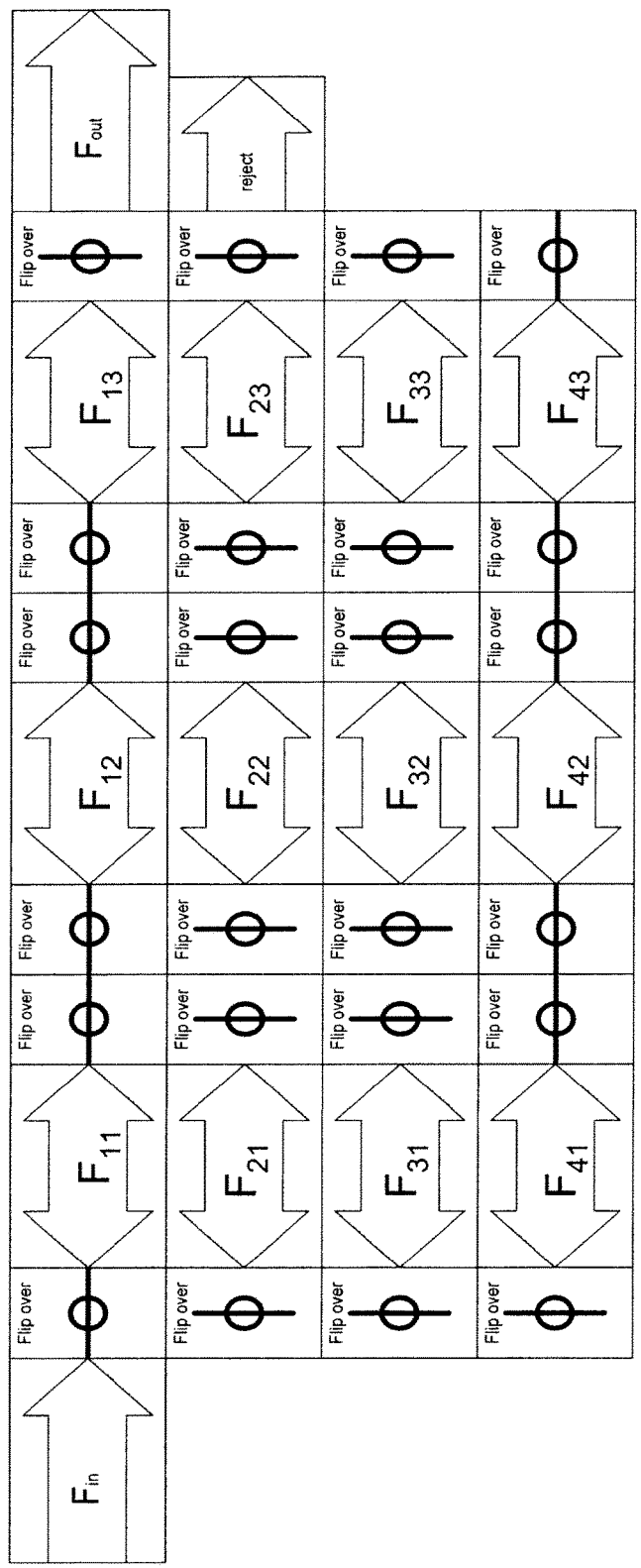
FIGS. 8A to 8J schematically illustrate the operation of an object processing machine according to the further embodiment of the invention.

With reference to FIG. 8A to FIG. 8J the working sequence of this further embodiment of a processing machine will be described exemplarily. As illustrated in FIG. 8A the processing machine is made up of four rows of basic processing modules arranged in three columns. Each processing module is provided on each of its side with a flip over unit. In this way a double channel of flip over units is provided between the first and second columns and the second and third columns. In this particular embodiment the processing machine is provided with a single input unit $F_{in}$ and two output units: $F_{out}$ and reject output. It is conceivable that in alternative embodiments of the invention the processing unit may be fitted with any number of inputs and outputs up to a maximum number of 16 for the illustrated example, one for each externally located flip over unit.

Figure 8B:
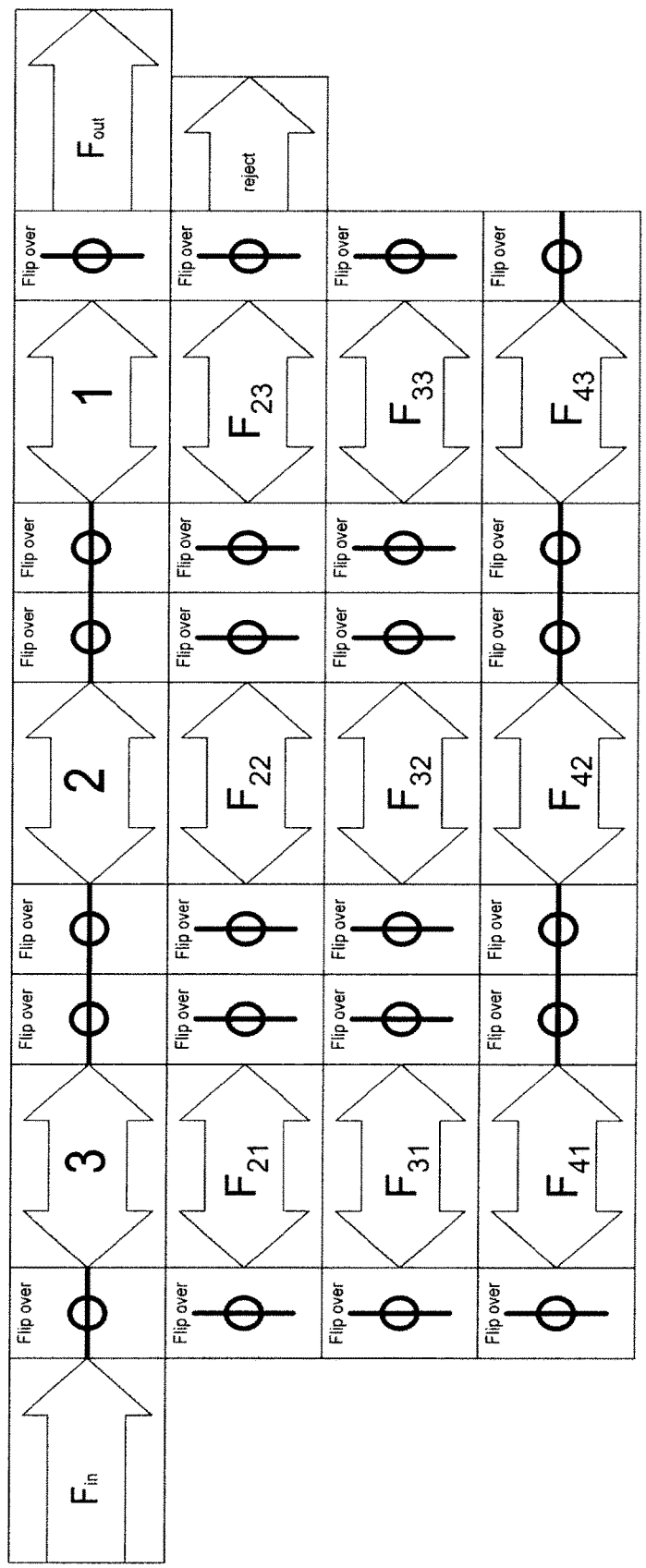
Figure 8C:
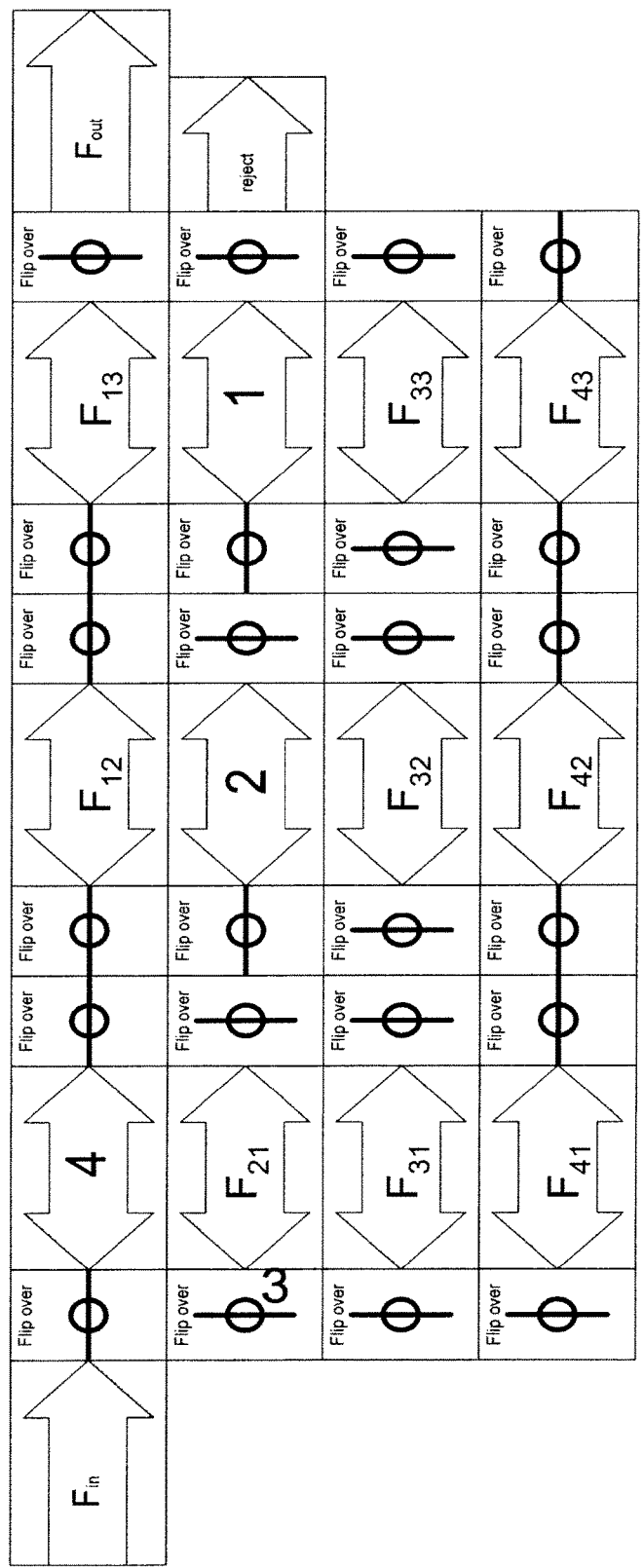

In an initial phase of the processing procedure the flip over units $FO_{11R}$, $FO_{12R}$, $FO_{12L}$, $FO_{13R}$, $FO_{13L}$ of the processing modules $F_{11}$, $F_{12}$ and $F_{13}$ of the upper row of the processing machine are orientated in a horizontal position. Thus, as illustrated in FIG. 8B, three cards 1, 2 and 3 can be transferred to processing units $F_{13}$, $F_{12}$ and $F_{11}$ respectively. Card 1 may be processed by units $F_{11}$ and $F_{12}$ before being received by processing unit or $F_{13}$ or the card 1 may be simply transferred through either or both of these units without any processing procedure taking place. With reference to FIG. 8C card 1 may then be transferred to processing unit $F_{23}$ by rotation of flip over units $FO_{13L}$ and $FO_{23L}$ from a horizontal position to a vertical position in order to hand over the card 1 to the next row and successively rotate of flip over unit $FO_{23L}$ from a vertical position to a horizontal position in order to transfer the card 1 into the processing unit $F_{23}$. Alternatively card 1 may be transferred from processing unit $F_{13}$ to processing unit $F_{23}$ by using the flip over units $FO_{13R}$ and $FO_{23R}$ in a similar way than $FO_{13L}$ and $FO_{23L}$.

Card 2 may be transferred from processing unit $F_{12}$ to processing unit $F_{22}$ by rotation of flip over unit $FO_{12L}$ and $FO_{22L}$ from a horizontal position to a vertical position in order to hand over the card 2 to the next row and successively rotate of flip over unit $FO_{22L}$ from a vertical position to a horizontal position in order to transfer the card 2 into the processing unit $F_{22}$. Alternatively card 2 may be transferred from processing unit $F_{12}$ to processing unit $F_{22}$ using the flip over units $FO_{12R}$ and $FO_{22R}$ in a similar way than $FO_{12L}$ and $FO_{22L}$.

Card 3 is transferred towards processing unit $F_{21}$ by means of flip over unit $F_{11L}$ and $F_{21L}$ while a fourth card 4 is received in processing unit $F_{11}$ by means of flip over unit $FO_{11L}$. Transferring the card 3 from processing unit $F_{11}$ to processing unit $F_{21}$ by using the flip over units $FO_{11R}$ and $FO_{21R}$ similar to the way described above for card 1 and 2, will give the advantage that the card 4 can be received by the processing unit $F_{11}$ without delay caused by the flip over unit $FO_{11L}$.

Figure 8D:
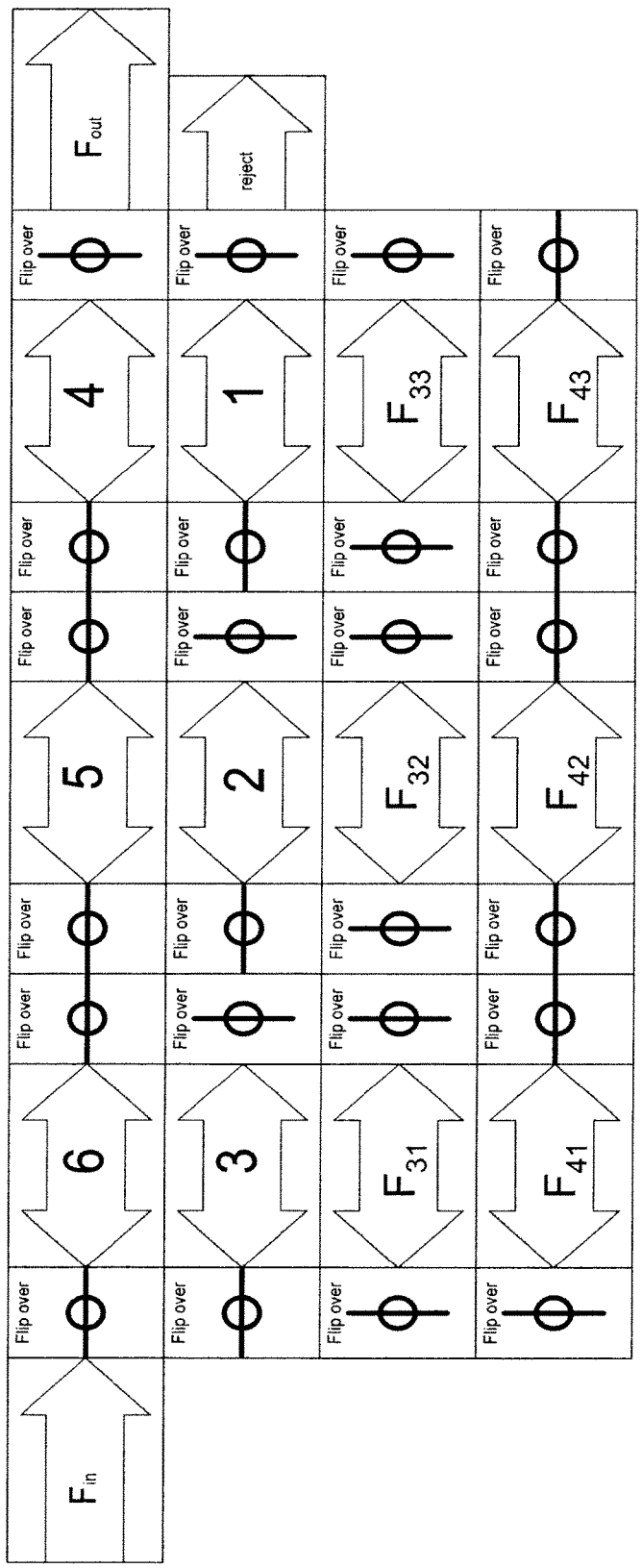

As can be seen in FIG. 8D while cards 1 to 3 are moved to the second row for processing by processing units $F_{23}$, $F_{22}$ and $F_{21}$ respectively, cards 4, 5 and 6 are received in the top row for processing by processing units $F_{11}$, $F_{12}$ and $F_{13}$. In this way processing of various cards can be carried out simultaneously by several units thereby increasing the throughput rate of card processing.

Figure 8E:
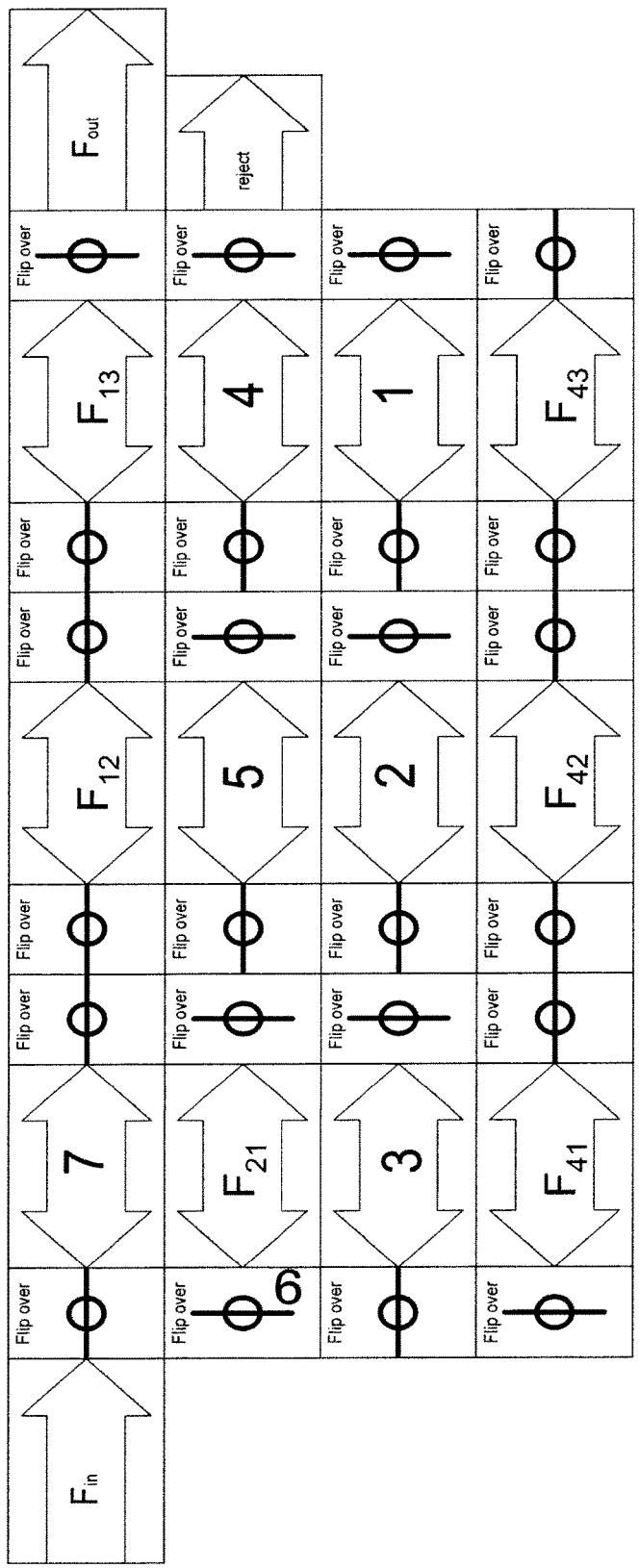
Figure 8F:
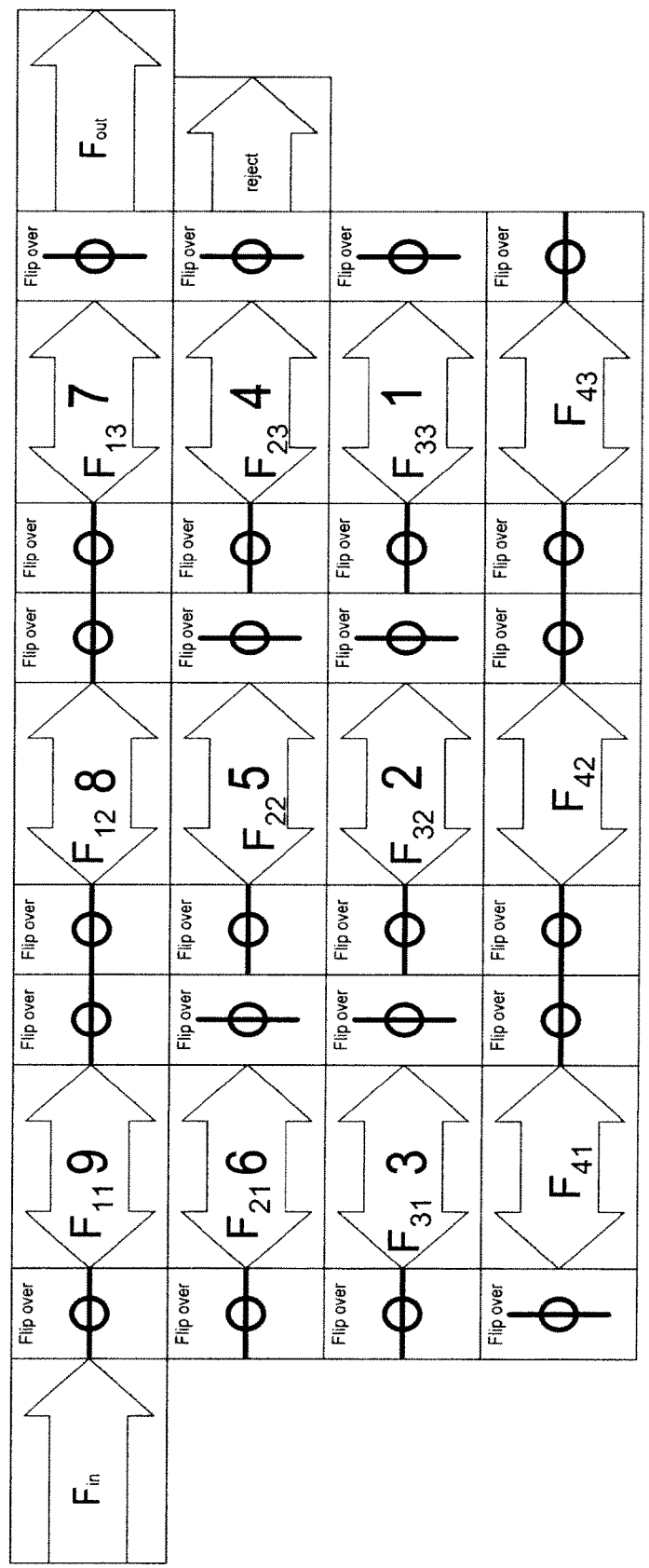
Figure 8G:
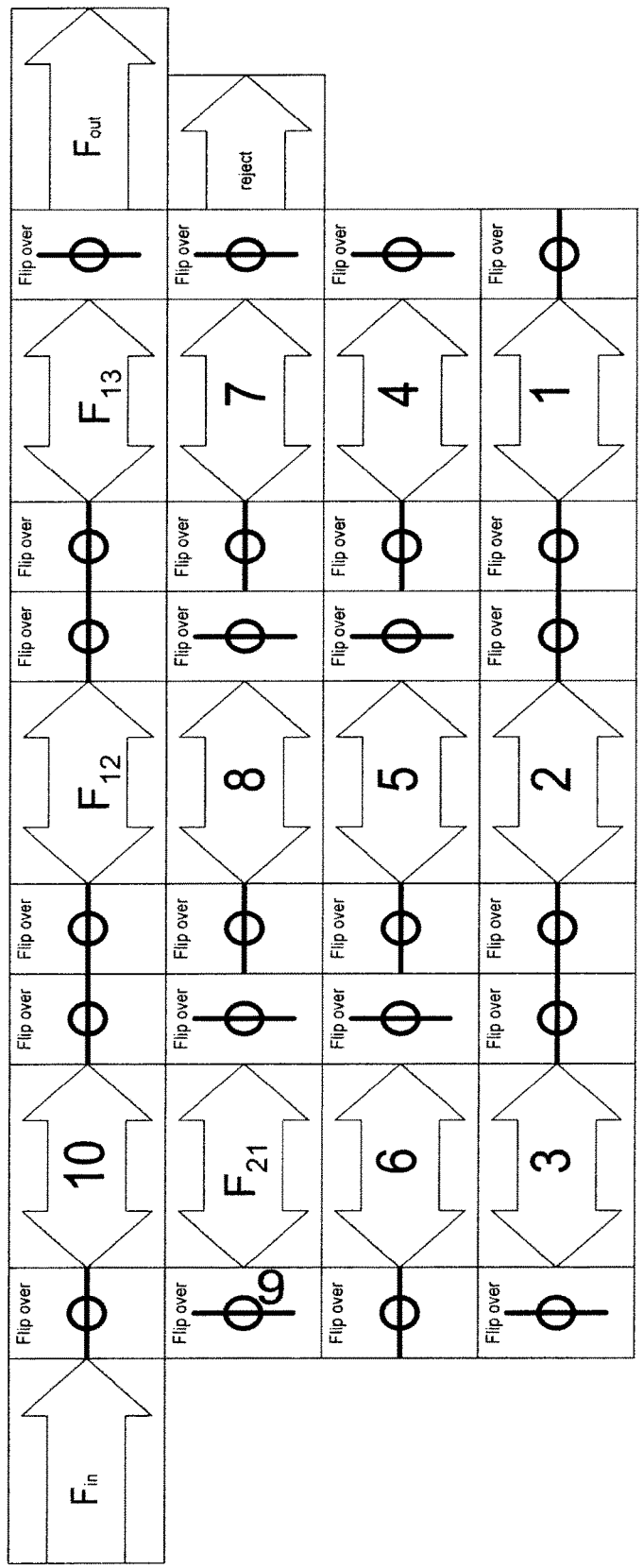

With reference to FIG. 8E, cards 1 to 3 can be transferred to the third row of processing units $F_{31}$, $F_{32}$ and $F_{33}$ by appropriate rotation of the corresponding flip over units while cards 4 to 6 are transferred to the second row of processing units $F_{21}$, $F_{22}$ and $F_{23}$. At the same time cards 7 to 9 can be received on the top row of processing units $F_{11}$ to $F_{13}$ as illustrated in FIG. 8F.

Figure 8H:
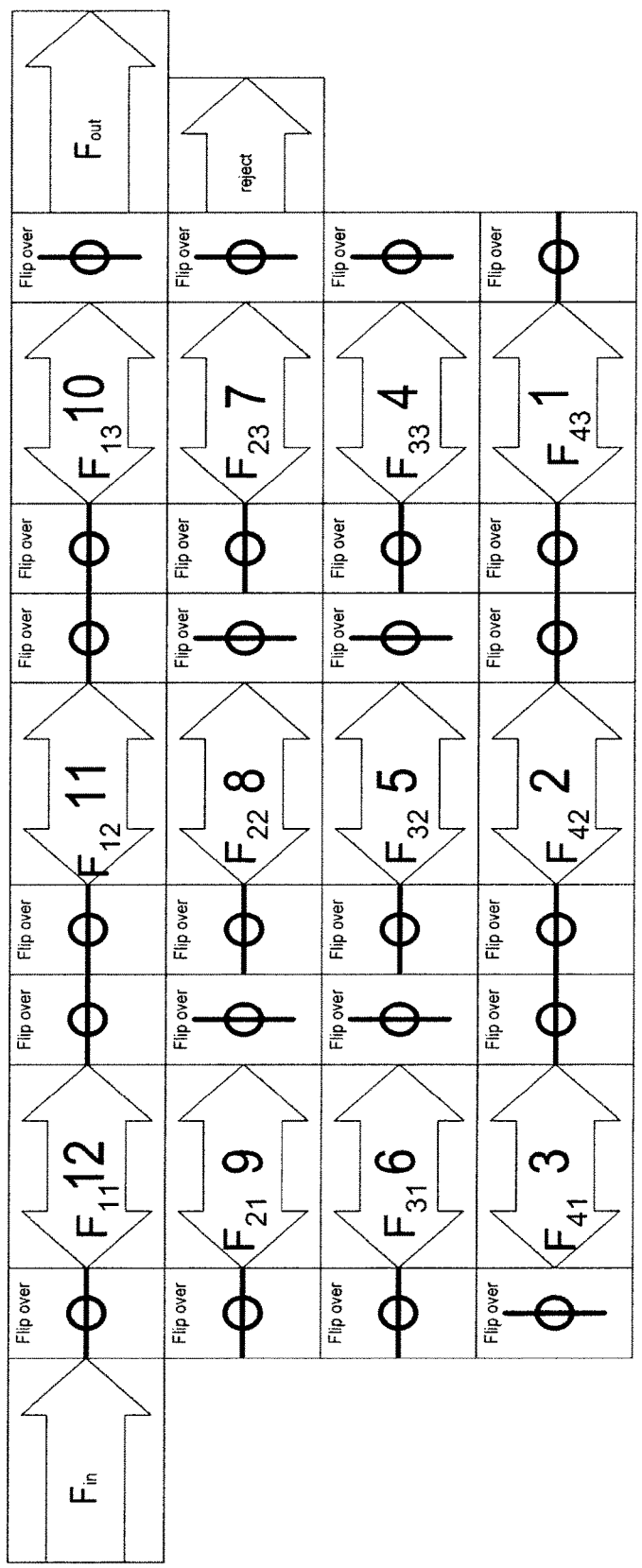

Continuing the procedure, cards 1 to 3 can be transferred to the fourth row of processing modules $F_{41}$ to $F_{43}$, cards 4 to 6 may be transferred to the third row of processing modules $F_{31}$ to $F_{33}$, cards 7 to 9 may be transferred to the second row of processing modules $F_{21}$ to $F_{23}$ while cards 10 to 12 are received on the first row of processing modules $F_{11}$ to $F_{13}$ as illustrated in FIG. 8H. In this way 12 processing procedures may be carried out simultaneously thereby increasing throughput.

Figure 8I:
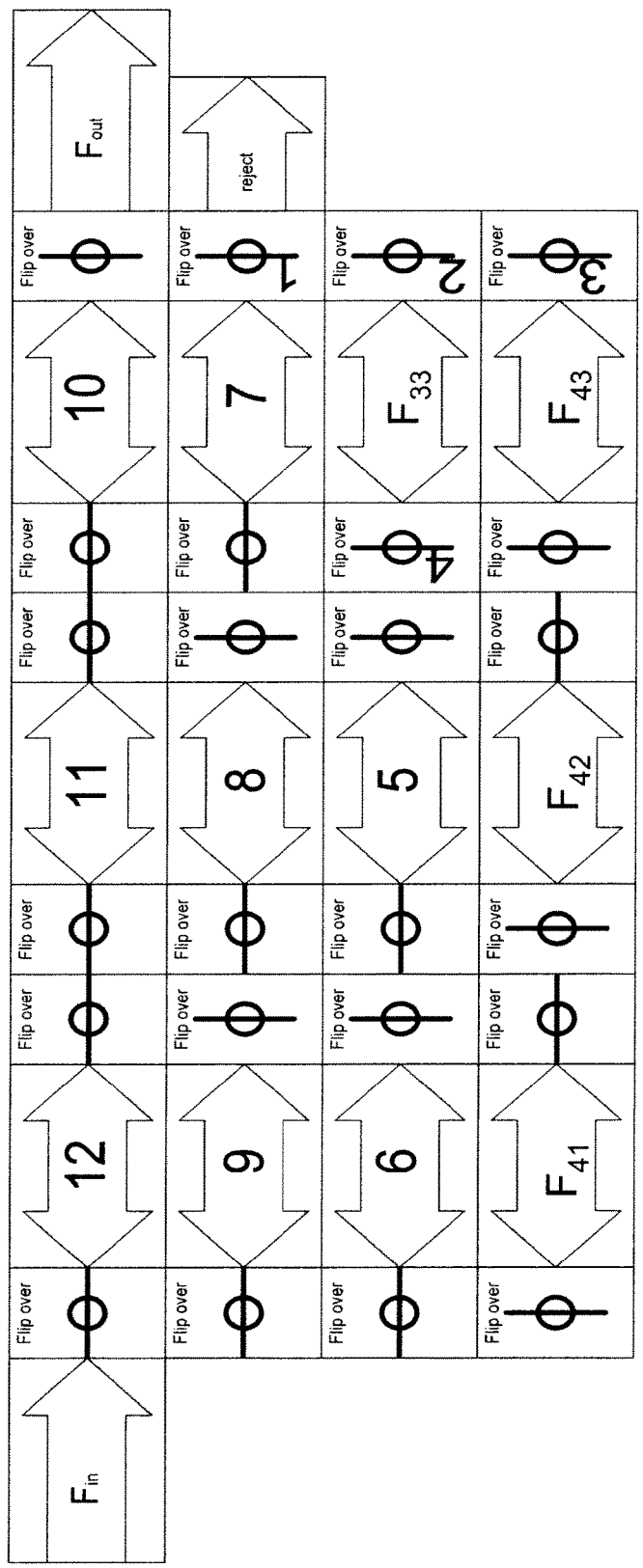

As illustrated in FIG. 8I cards 1 to 3 can then be directed towards the output from the fourth row by means of flip over units $FO_{43R}$, $FO_{33R}$ and $FO_{23R}$.

Figure 8J:
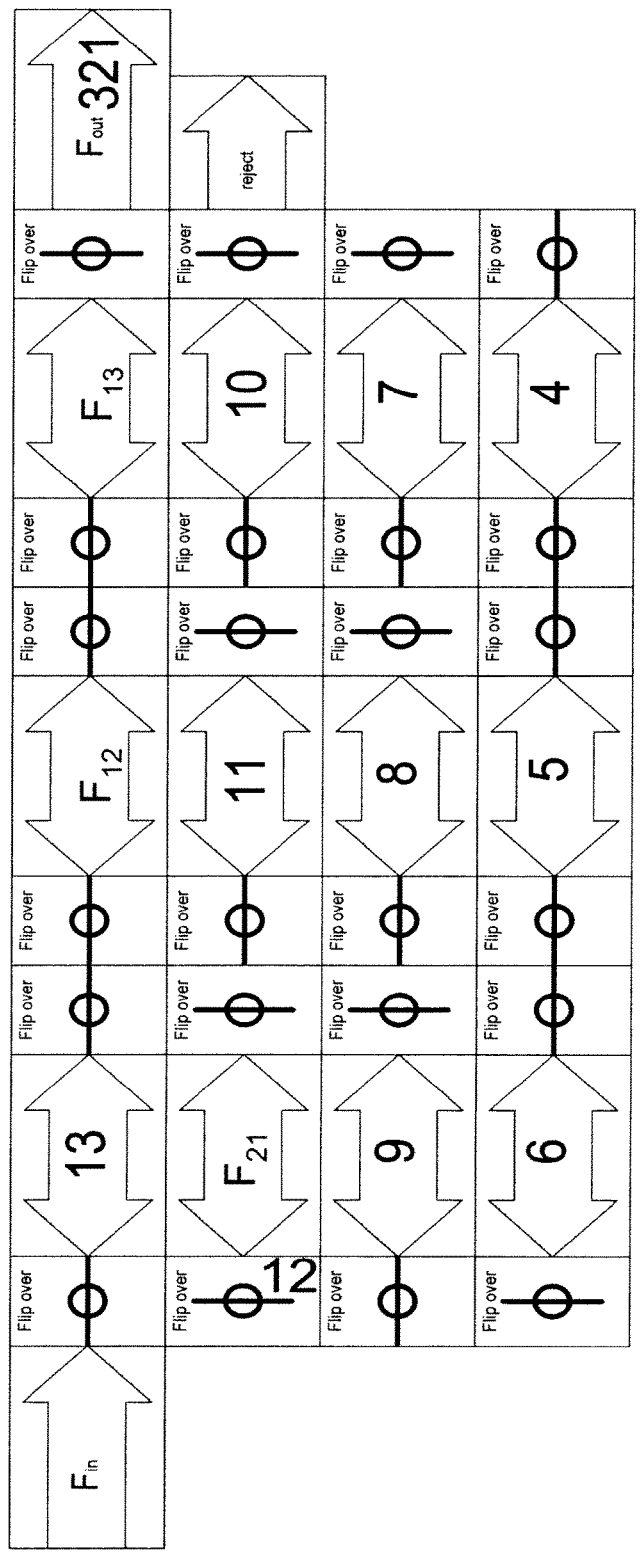

As illustrated in FIG. 8J cards 1 to 3 are output through output unit $F_{out}$ while a further card 13 is received through input $F_{in}$ to processing unit $F_{11}$. The procedure may continue until all cards have been processed and transferred to the output through output unit $F_{out}$.

It is conceivable that each card i or a group of cards may proceed via different pathways through the machine so that different processing procedures are implemented according to the type of card or group of cards. Each card may be processed by each processing unit through which it passes or it may be transferred through a unit without being processed by that unit because the processing unit is located on its programmed path.

Figure 10:
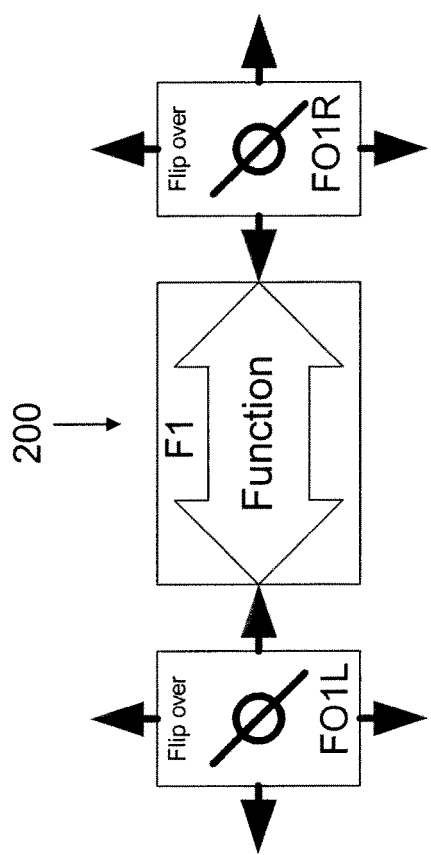
FIG. 10 is a schematic view of a basic processing module according to a second embodiment of the invention.

In further embodiment of a basic processing module 200 as illustrated in FIG. 10, the basic processing module 200 is an independent module which may be removably connected by means of a corresponding interface to one or two separate flip over units $FO_{1L}$ and/or $FO_{1R}$.

Figure 11:
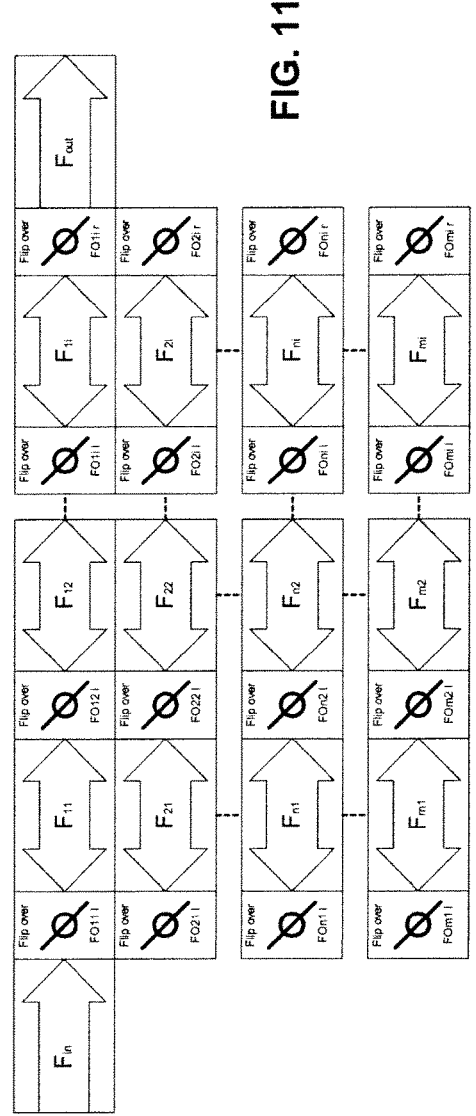
FIG. 11 is a schematic view of a object processing machine including basic processing modules according to the second embodiment of the invention.

With such a basic processing module a matrix configuration may be formed in which a single row of Flip over units $FO_n$ is disposed between the rows of processing modules $F_n$ as illustrated in the embodiment of FIG. 11. This embodiment provides the advantage of placing a variable number of flip over units $FO_{nL}$ and $FO_{nR}$ between two processing modules without any change in the hardware design depending on the actual requirements to the object processing machine.

In embodiments of the invention each processing module may be equipped with a respective control unit for controlling the processing operation to be carried out on each object, according to the object and from controlling the transfer of an object from one processing module to the next resulting in a distributed intelligent system. A control system (not shown) such as a computer or processor or the like can be connected via the base of the object processing machine and can manage the overall sequential control of the object processing machine so that an object or a group of objects can be processed according to a pre-defined set of rules dedicated to the said object or the said group. Different paths through the object processing machine can be programmed according to the object or group of objects being processed. Each object is not obliged to pass through each processing module in order to pass from one processing module to another. Each object may only be processed by a subset of the processing modules Bi-directional paths through the object processing machine enhance the flexibility and potential applications of the object processing machine The low production costs of the modular units enables an object processing to machine according to embodiments of the invention to be produced at reduced costs. In this way the overall object processing machine benefits from the reduced manufacture costs of single units which may be produced in large scale, manufactured by processes such as plastic moulding, while still allowing complex object processing machines to be built.

The methods according to the embodiments of the invention can enable increased production rates since an increased number of objects may be processed simultaneously even if the processing operation differs from object to object.

Although the present invention has been described hereinabove with reference to specific embodiments, the present invention is not limited to the specific embodiments, and modifications will be apparent to a skilled person in the art which lie within the scope of the present invention.

For instance, while the foregoing examples have been explained with respect to the processing including personalisation operations of SIM cards it will be appreciated that the methods can be applied to the processing of any type of portable object such as work-pieces or other entities where a plurality of processing operations is required.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A card processing system that processes a card, comprising:
   a plurality of card processing modules that are arranged into an array of columns and rows;
   each one of the card processing modules includes:
     a first card input/output, a second card input/output, a card transport path between the first card input/output and the second card input/output, a card processing unit located along the card transport path between the first card input/output and the second card input/output that is configured to perform a card processing operation, and a first rotatable card flip over unit located along the card transport path between the first card input/output and the second card input/output that can linearly transport the card along the card transport path and can flip the card 180 degrees and/or direct the card in a desired direction;
     the first card input/output, the second card input/output, the card processing unit and the first rotatable card flip over unit are arranged relative to one another along a straight line, and the card transport path is linear;
     each one of the card processing modules further includes a second rotatable card flip over unit located along the card transport path between the first card input/output and the second card input/output that can flip the card 180 degrees and/or direct the card in a desired direction;
   a first plurality of the card processing modules in the array are arranged relative to one another to define a first internal card transport pathway through the first plurality of the card processing modules, and a second plurality of the card processing modules in the array are arranged relative to one another to define a second internal card transport pathway through the second plurality of the card processing modules, and at least a portion of the second internal card transport pathway does not extend through at least some of the card processing modules of the first plurality.

2. The card processing system according to claim 1, wherein the first rotatable card flip over unit is positioned between the first card input/output and the card processing unit, and the second rotatable card flip over unit is positioned between the second card input/output and the card processing unit.

3. The card processing system according to claim 1, wherein the card processing unit is configured to perform chip programming, embossing, laser marking, graphic marking, or verifying the card.

4. The card processing system according to claim 1, wherein for each one of the card processing modules, the first rotatable card flip over unit and the second rotatable card flip over unit are each rotatable to at least four positions to direct the card in four different directions, and the four directions are perpendicular to one another.

5. The card processing system according to claim 1, wherein the card includes a programmable chip, and further comprising a contact or contactless programming device that can program the chip.

6. The card processing system according to claim 1, wherein the card has an ID 1 format.

7. The card processing system according to claim 1, wherein the card is a credit card or an identification card.

* * * * *